US009856730B2

(12) United States Patent
Butner et al.

(10) Patent No.: US 9,856,730 B2
(45) Date of Patent: Jan. 2, 2018

(54) MICROWAVE COMMUNICATION SYSTEM FOR DOWNHOLE DRILLING

(71) Applicant: Altan Technologies Inc., Vancouver (CA)

(72) Inventors: Wayne Butner, Vancouver (CA); Michael P. Sanders, Lexington, KY (US)

(73) Assignee: Altan Technologies Inc., Vancouver (CA)

( * ) Notice: Subject to any disclaimer, the term of this patent is extended or adjusted under 35 U.S.C. 154(b) by 179 days.

(21) Appl. No.: 14/778,984

(22) PCT Filed: Mar. 20, 2014

(86) PCT No.: PCT/CA2014/050299
§ 371 (c)(1),
(2) Date: Sep. 21, 2015

(87) PCT Pub. No.: WO2014/146207
PCT Pub. Date: Sep. 25, 2014

(65) Prior Publication Data
US 2016/0047233 A1    Feb. 18, 2016

Related U.S. Application Data

(60) Provisional application No. 61/804,100, filed on Mar. 21, 2013.

(51) Int. Cl.
*G01V 3/00* (2006.01)
*E21B 47/14* (2006.01)
(Continued)

(52) U.S. Cl.
CPC ............ *E21B 47/12* (2013.01); *E21B 47/122* (2013.01); *H04W 4/00* (2013.01)

(58) Field of Classification Search
USPC ...................................... 367/81–82
See application file for complete search history.

(56) References Cited

U.S. PATENT DOCUMENTS

| 2,507,351 A | 5/1950 | Scherbatskoy |
| 5,831,549 A | 11/1998 | Gearhart |

(Continued)

FOREIGN PATENT DOCUMENTS

| EP | 1549820 | 11/2006 |
| GB | 2 184 581 | 6/1987 |
| GB | 2 275 283 | 8/1994 |

OTHER PUBLICATIONS

National Oilwell Varco, "IntelliServ", http://www.nov.com/Segments/Wellbore_Technologies/IntelliServ/IntelliServ.aspx.
(Continued)

*Primary Examiner* — Firmin Backer
*Assistant Examiner* — Jerold Murphy
(74) *Attorney, Agent, or Firm* — Philip D. Askenazy; Peacock Myers, P.C.

(57) ABSTRACT

In one embodiment of the invention, an air drilling downhole telemetry and control system is disclosed, comprising a telemetry and control interface, a topside unit, one or more repeater units, a bottom hole unit, and an air filled drill string composed of a drill pipe acting as a circular waveguide, wherein the topside unit is disposed at the surface end of the drill string, the repeater units are disposed along the drill string, and the bottom hole unit is disposed at the terminal end of the drill string, and each unit is a communications node along a communications link existing between the telemetry and control interface and the bottom hole unit. Each unit comprises a communications subsystem, a power subsystem, and optionally a telemetry and control subsystem. The communications subsystem contains a message buffer system capable of temporarily storing communica- (Continued)

tions during a communications link disruption event. Obstructions along the drill string, such as one-way valves, are incorporated into the repeater units disposed along the drill string.

17 Claims, 19 Drawing Sheets

(51) Int. Cl.
*G01V 1/40* (2006.01)
*E21B 47/16* (2006.01)
*E21B 47/00* (2012.01)
*E21B 47/12* (2012.01)
*H04W 4/00* (2009.01)

(56) References Cited

U.S. PATENT DOCUMENTS

| | | |
|---|---|---|
| 6,766,141 B1 | 7/2004 | Briles et al. |
| 7,046,164 B2 * | 5/2006 | Gao ............... G01V 11/002 333/242 |
| 7,411,517 B2 | 8/2008 | Flanagan |
| 7,819,206 B2 | 10/2010 | Peter |
| 8,941,384 B2 * | 1/2015 | Prammer ........... E21B 17/003 324/338 |
| 2005/0024231 A1 * | 2/2005 | Fincher .............. E21B 17/028 340/854.4 |
| 2009/0201170 A1 * | 8/2009 | Reckmann ........... E21B 47/12 340/854.4 |
| 2011/0018734 A1 * | 1/2011 | Varveropoulos ..... G01V 11/002 340/853.7 |
| 2011/0048692 A1 | 3/2011 | Ross et al. |

OTHER PUBLICATIONS

"IntelliServ", http://en/wikipedia.org/wiki/IntelliServ, Aug. 3, 2015.
"International Preliminary Report on Patentability (Chapter I) for PCT/CA2014/050299", dated Jun. 10, 2014.
"Written Opinion of the International Searching Authority for PCT/CA2014/050299", dated Jun. 10, 2014.
Meng, et al., "Microwave propagation in air drilling", Pet. Sci., 2010, 390-396.

* cited by examiner

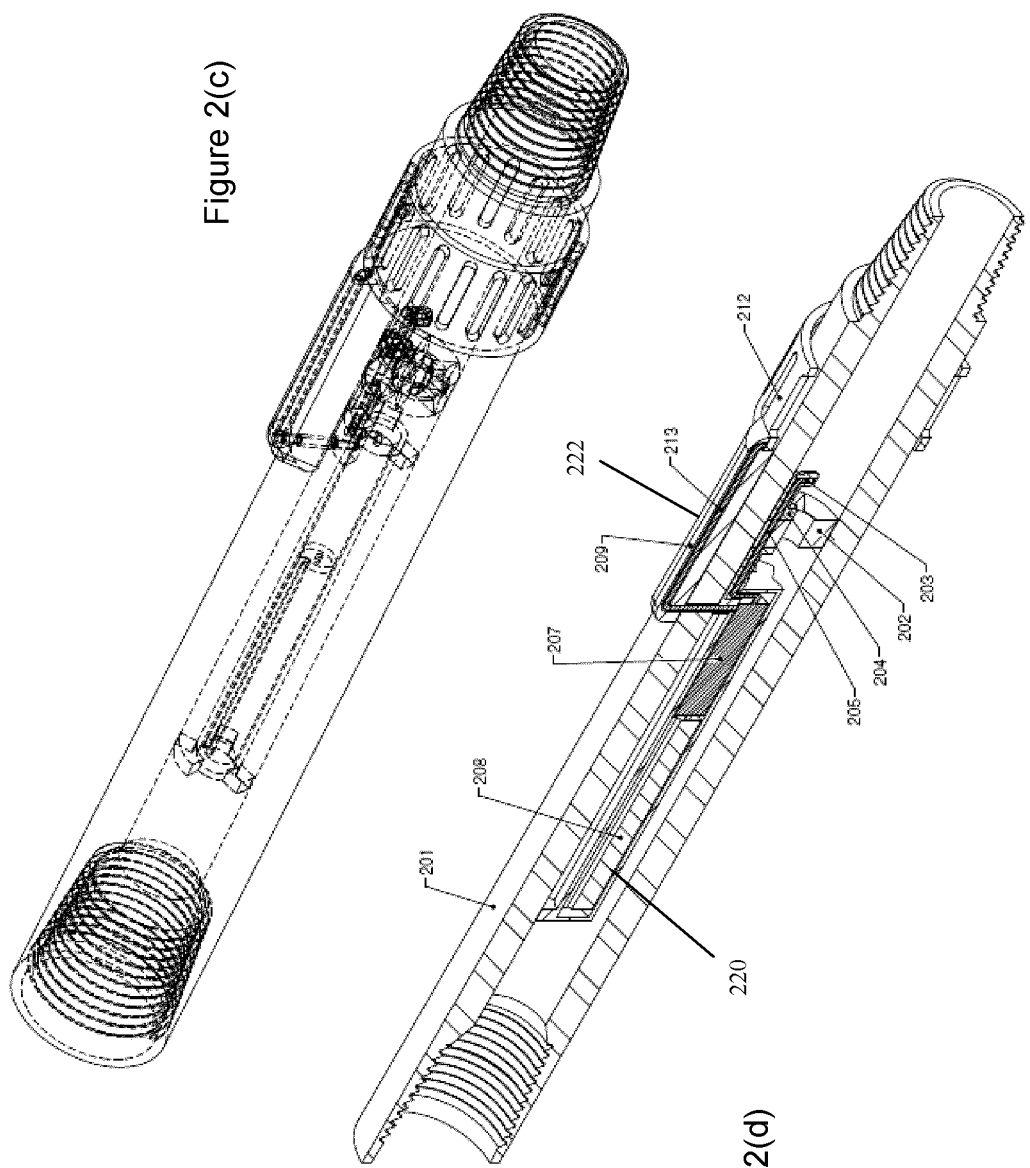

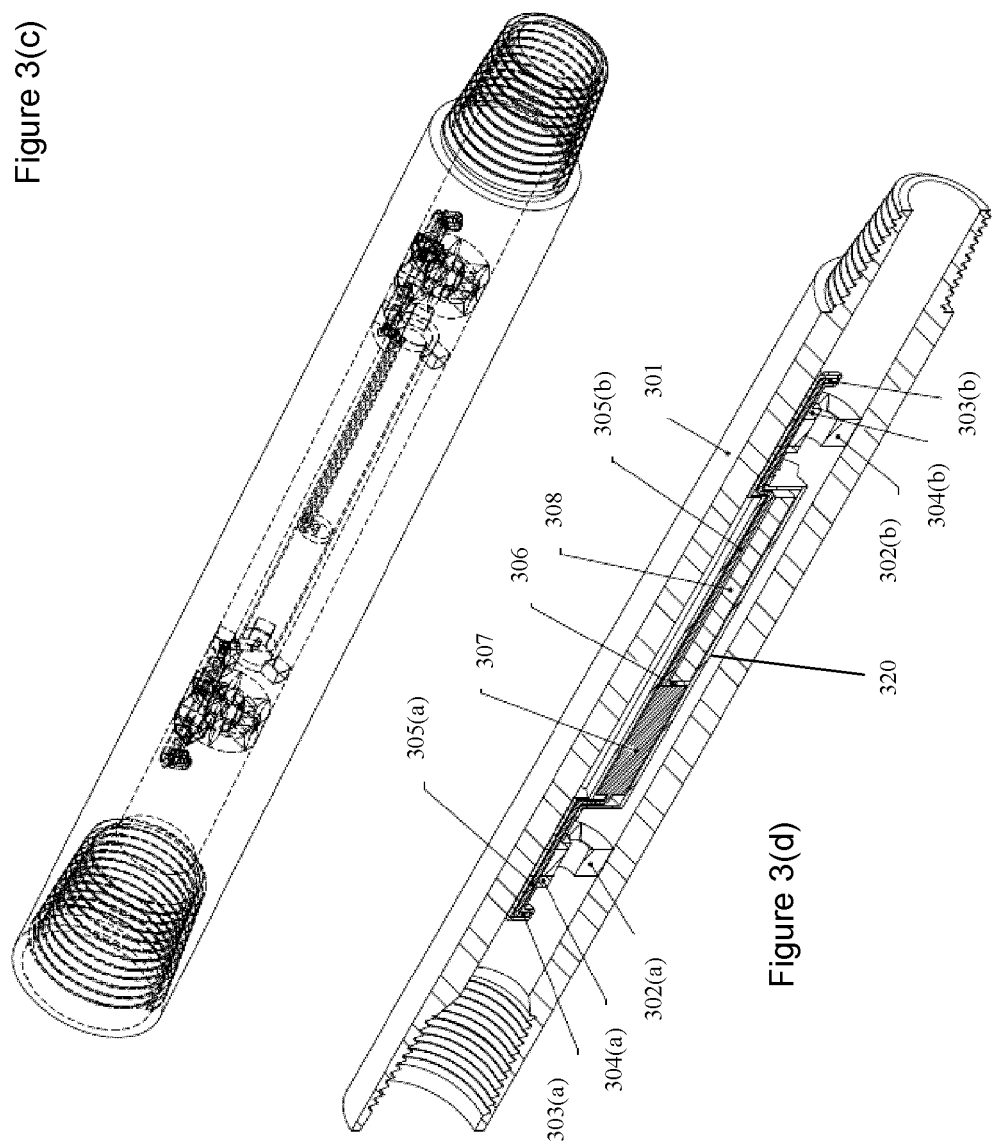

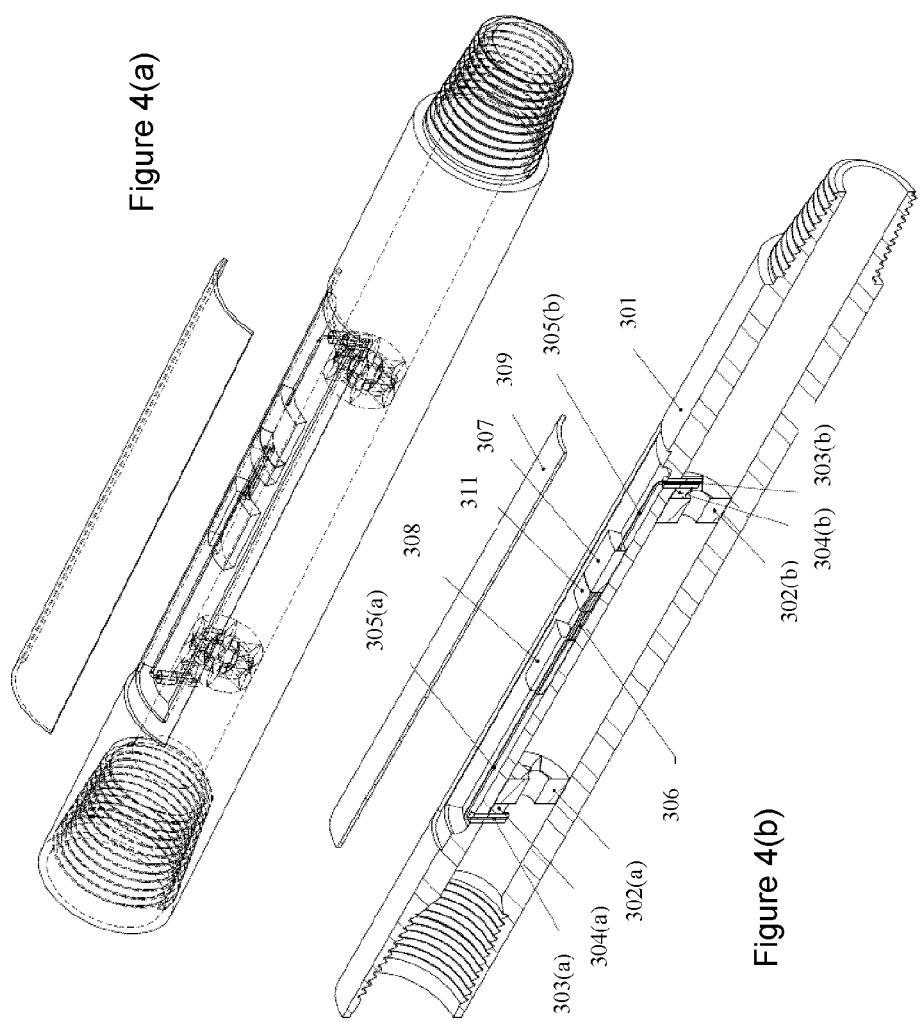

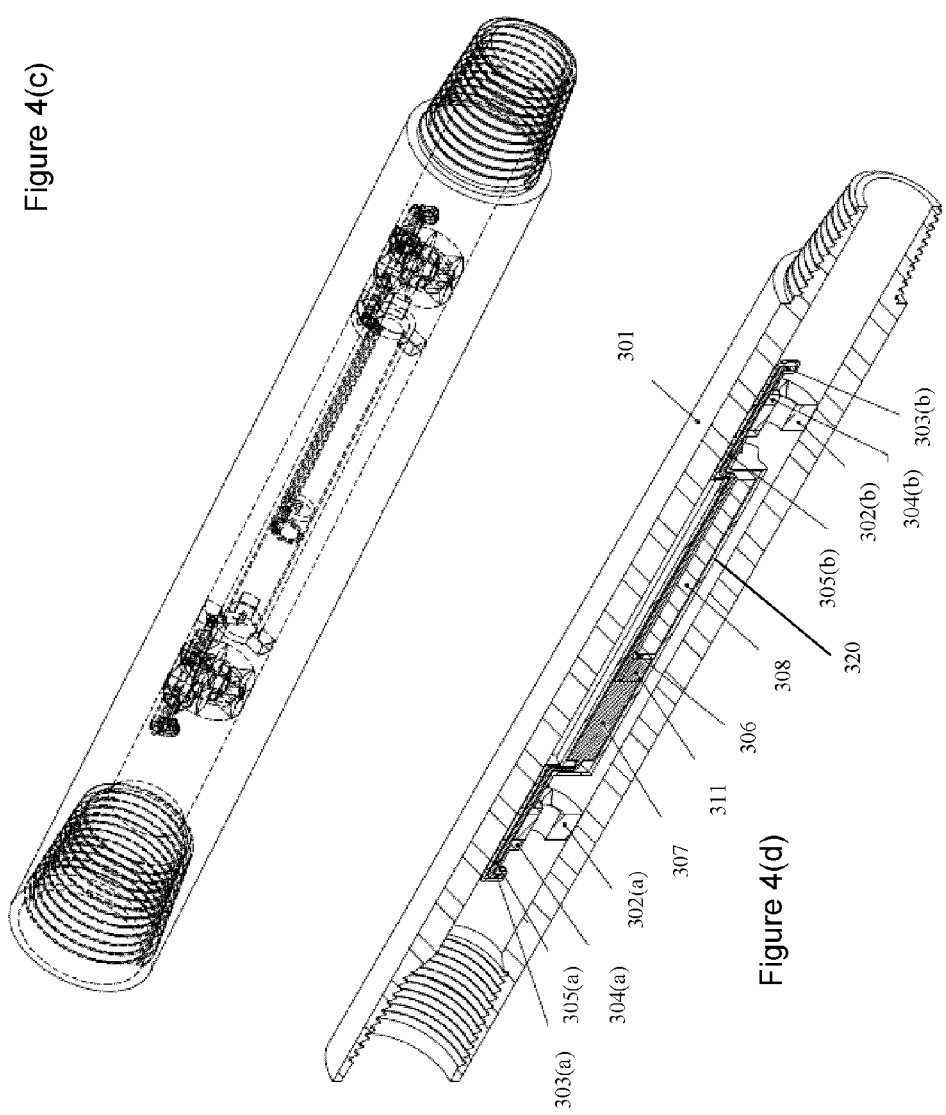

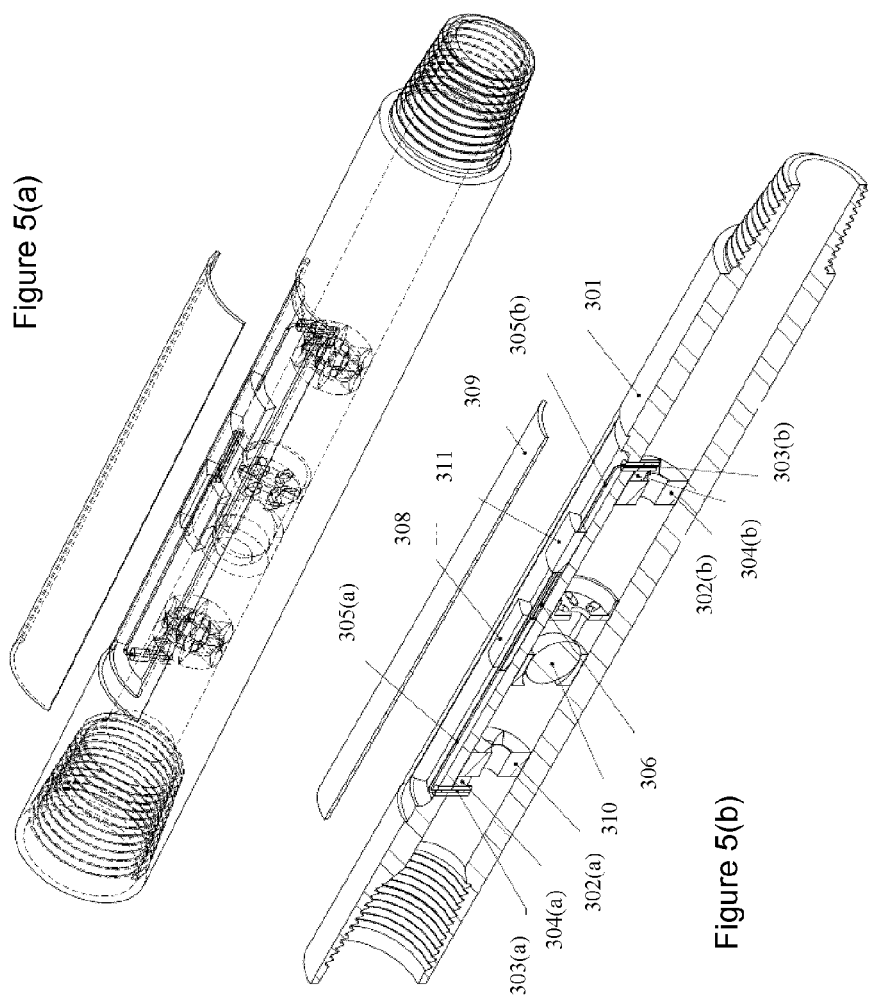

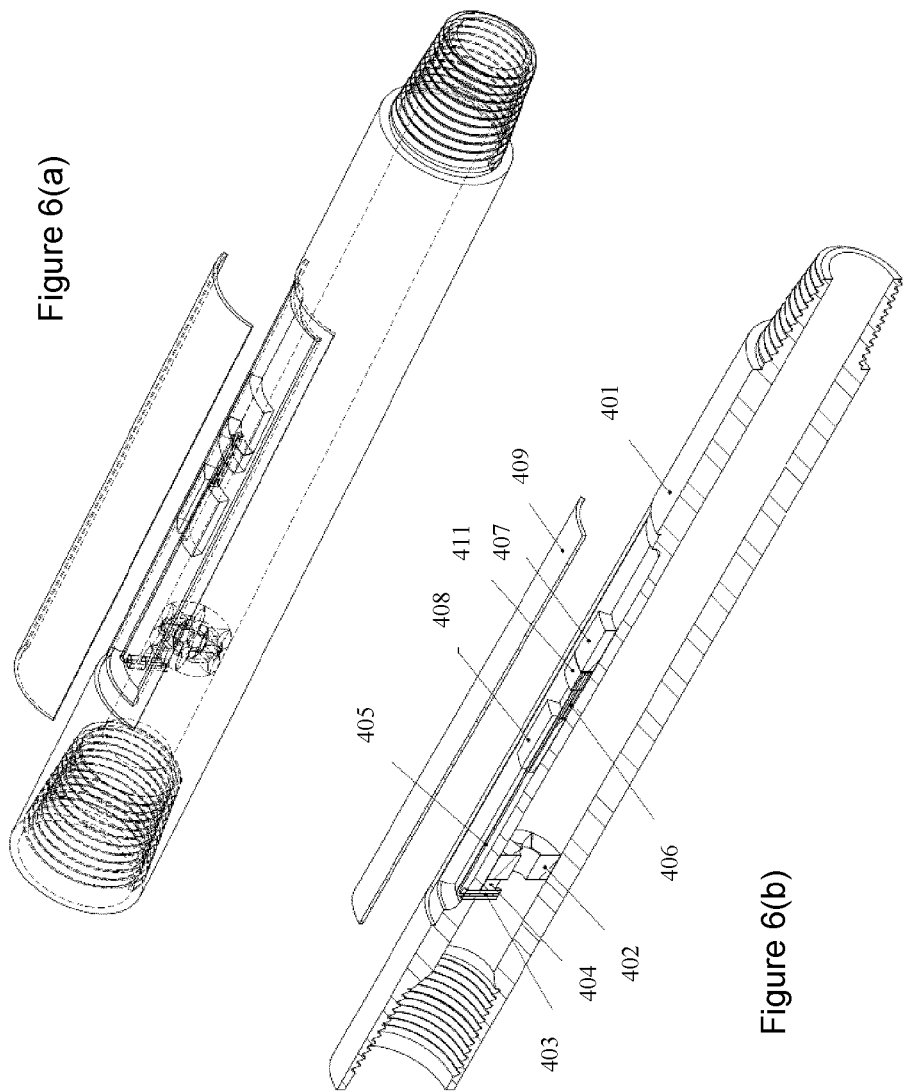

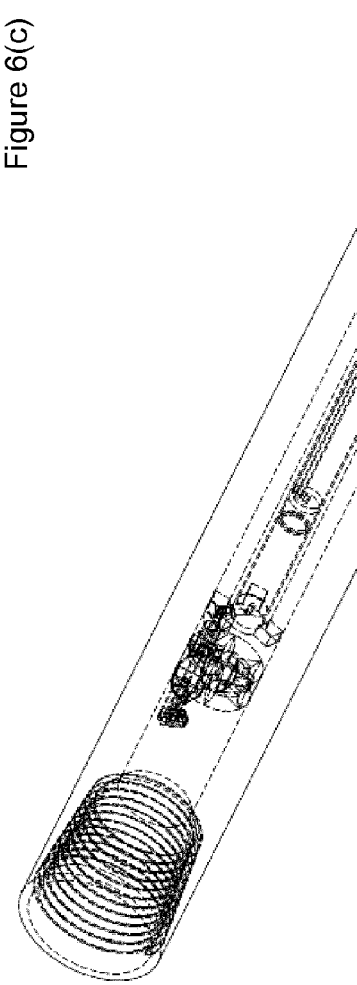
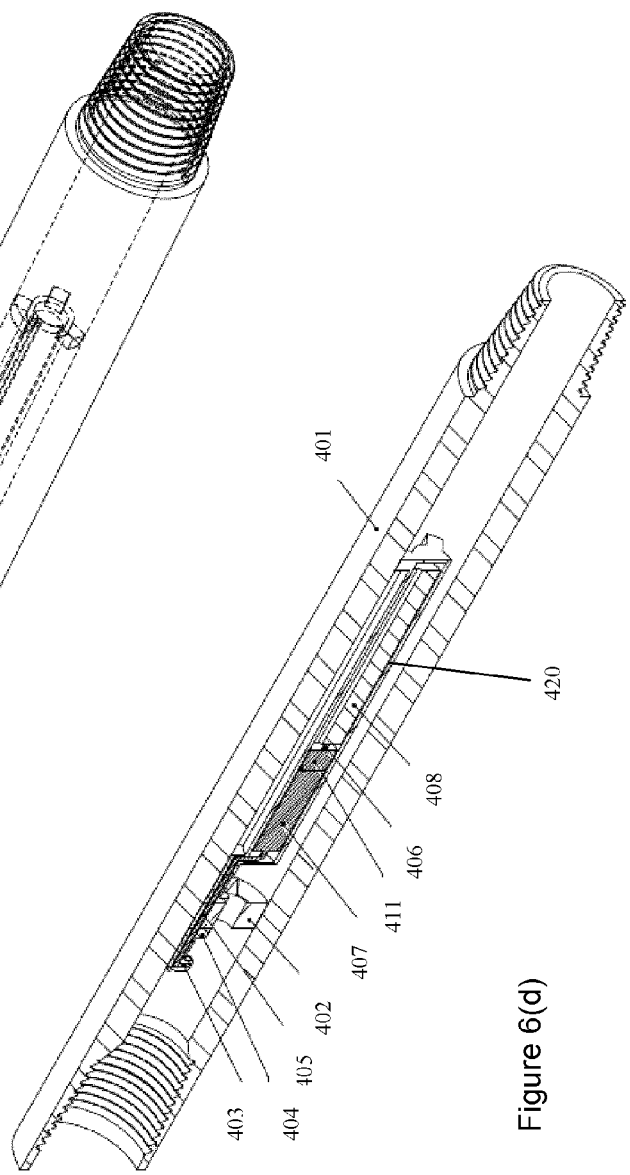
Figure 6(c)
Figure 6(d)

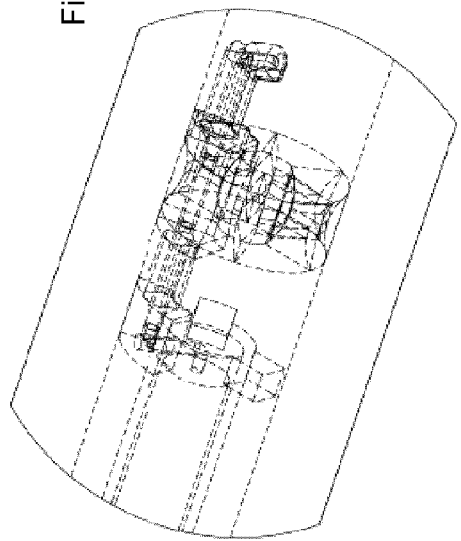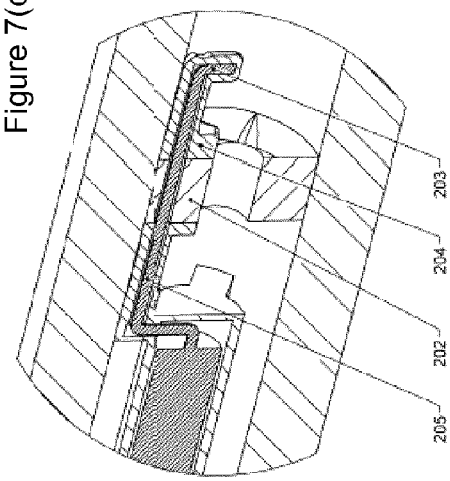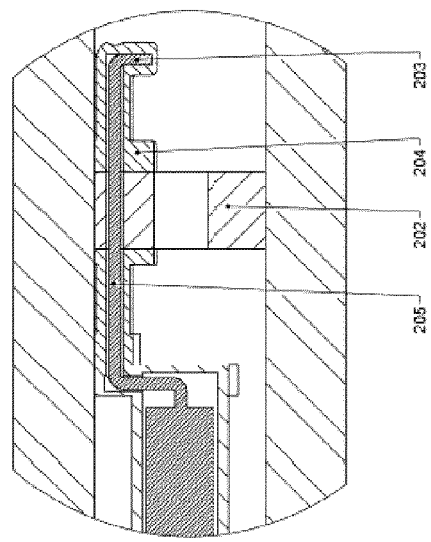

MICROWAVE COMMUNICATION SYSTEM FOR DOWNHOLE DRILLING

FIELD

This invention relates generally to a microwave communications system for downhole drilling operations, including but not limited to: oil and gas, mining, utility, and geothermal downhole drilling operations.

BACKGROUND

Air drilling is a downhole drilling operation that relies on compressed air or gases, delivered through the inside of a drill string to power a drilling motor and cause a drill bit to rotate or to power an air drilling hammer, and to cool the drill bit at the terminal end of the drill string and transport rock cuttings in the borehole to the surface. It is especially useful in drilling operations concerning dry hard rock lithology. At the terminal end of the drill string is a bottom-hole-assembly (BHA) which comprises a drill bit, a downhole motor of a rotary steerable system, sensors of survey equipment for Logging While Drilling (LWD) and/or Measurement-while-drilling (MWD) to evaluate downhole conditions as well depth progresses, means for transmitting telemetry data to surface, and other control equipment. Compared to mud drilling for hard rock lithology operations, air drilling is more economical, cleaner in terms of operating conditions, more effective in controlling pressure especially through lost circulation zones, and generally has faster rates of penetration. Bidirectional data communication between the telemetry and control interface at the surface of the drilling operation and points along the drill string (the terminal end) is used for MWD and LWD and for controlling the drilling operation beneath the surface. There are various known ways of implementing bidirectional data communication including wireless means such as electromagnetic (EM) telemetry and wired means such as the IntelliServ™ system by National Oil Varco. EM telemetry has found utility in specific applications such as underbalanced drilling or air drilling. However, this telemetry technique transfers data at a relatively low rate, is generally expensive and time consuming to deploy, and is not suitable for certain types of formations. Wired telemetry has also been used to facilitate bidirectional data communication in drilling operations. However, wired telemetry also has limitations such as vulnerability to damage.

Microwave frequency telemetry transmission has been proposed for air drilling applications to facilitate bidirectional data communication between the surface and terminal ends of the drill string. Using the drill string as a circular waveguide, transmitting telemetry and control instructions via microwave frequencies has the potential to provide a relatively high rate of wireless data transfer. However, this telemetry technique currently faces a number of challenges in downhole drilling operations, especially air drilling operations. A typical drill string has a number of obstructions which can attenuate and reflect microwave signals and thus is not an ideal microwave waveguide. Signal interference and degradation can be especially pronounced in long drill strings, some of which can be up to 10,000 feet in length. Air drilling drill strings pose particular challenges as one way valves along the drill string, compressors and boosters at surface and components of the bottom hole assembly all present significant reflection and attenuation challenges. Further, during an air drilling operation, foam and mist can be injected into the drill string to improve air drilling functions, but tend to impede or interrupt microwave communication along all or part of the drill string.

SUMMARY

According to one aspect of the invention, there is provided a wireless communication system for use in downhole drilling operations that comprises a plurality of wireless communication nodes. The nodes include a topside unit mountable around a top of a drill string that comprises: a tubular sub with an axial through-bore for flow of fluid therethrough, a microwave downlink transceiver subassembly mounted to the tubular sub and having an antenna feed extending into the through-bore, and a microwave reflector mounted inside the through-bore and upstring of the antenna feed. The reflector comprises at least one aperture and is configured to reflect a range of frequencies including an operating frequency of the downlink transceiver subassembly and to allow passage of fluid therethrough. The nodes also include a bottom hole unit mountable along the drill string downstring of the topside unit that comprises: a tubular sub with an axial through-bore for flow of fluid therethrough, a microwave uplink transceiver subassembly mounted to the tubular sub and having an antenna feed extending into the through-bore, and a microwave reflector mounted inside the through-bore and downstring of the antenna feed. The reflector comprises at least one aperture and is configured to reflect a range of frequencies including an operating frequency of the uplink transceiver subassembly and to allow passage of fluid therethrough. The nodes can optionally include one or more repeater units mountable along the drill string between and topside and bottom hole units. Each repeater unit comprise a tubular sub with an axial through-bore for flow of fluid therethrough, a microwave uplink transceiver subassembly mounted to the tubular sub and having an uplink antenna feed extending into the through-bore, a microwave downlink transceiver subassembly mounted to the tubular sub, communicatively coupled to the microwave uplink transceiver subassembly and having a downlink antenna feed extending into the through-bore, and at least one microwave reflector mounted inside the through-bore between the uplink and downlink antenna feeds. The reflector comprises at least one aperture and is configured to reflect a range of frequencies including the operating frequency of the uplink and downlink transceiver subassemblies and to allow passage of fluid therethrough. The system can further comprise a telemetry and control interface communicative with the topside unit.

The downlink transceiver subassembly of the topside unit and the uplink transceiver subassembly of a repeater unit adjacent and downstring of the topside unit are configured to communicate wirelessly with each other at a same operating frequency and together form a first communications segment. The uplink transceiver subassembly of the bottom hole unit and the downlink transceiver subassembly of a repeater unit adjacent and upstring of the bottom hole unit are configured to communicate wirelessly with each other at a same operating frequency and together form a second communications segment. When there are at least two repeater units, the downlink transceiver subassembly of a first repeater unit and the uplink transceiver subassembly of a second repeater unit adjacent and downstring of the first repeater unit are configured to communicate with each other at a same frequency and together form a third communications segment. At least two of the operating frequencies of the first, second and third communications segments are different from each other.

When the system comprises multiple repeater units, the operating frequencies of each communication segment can be different from each other.

At least one of the one or more repeater units can comprise an uplink microwave reflector mounted inside the through bore of the sub body downstring of the uplink antenna feed and a downlink microwave reflector mounted inside the through bore of the sub body upstring of the downlink antenna feed. The uplink reflector is configured to reflect a range of microwave frequencies including the operating frequencies of the uplink transceiver and the downlink reflector is configured to reflect a range of microwave frequencies including the operating frequencies of the downlink transceiver.

The uplink reflector can be positioned longitudinally along the through bore at a distance relative to the uplink antenna feed such that microwaves at the operating frequency of the uplink transceiver and propagating downstring are reflected constructively by the uplink reflector towards the uplink antenna feed. The downlink reflector can be positioned longitudinally along the through bore at a distance relative to the downlink antenna feed such that microwaves at the operating frequency of the downlink transceiver and propagating upstring are reflected constructively by the downlink reflector towards the downlink antenna feed.

At least one of the repeater units can comprise a telemetry subsystem with at least one measurement-while-drilling sensor and a communications subsystem communicative with the telemetry subsystem and comprising a processor and a memory having encoded thereon program code executable by the processor to read measurement data from the sensor and send the measurement data to the uplink transceiver subassembly to encode into microwave communication signals for transmission to an adjacent upstring communications node. Also, at least one of the repeater units can further comprise an obstruction receptacle inside the through bore of the sub in between the uplink and downlink antenna feeds and configured to receive an obstruction in the drill string, and wherein the uplink and downlink transceivers are communicatively coupled to each other by a hardwired connection. The drill string can be configured for an air drilling operation in which case the obstruction is an air drilling one-way valve. At least one of the repeater units can further comprise a communications link to a controllable device in the drill string, and a communications subsystem which is communicative with the communications link and at least one of the uplink and downlink transceiver subassemblies. The communications subsystem comprises a processor and a memory having encoded thereon program code executable by the processor to decode a microwave communications signal into control instructions and to control the controllable device in accordance with the control instructions.

The bottom hole unit can comprise a telemetry subsystem with at least one measurement-while-drilling sensor and a communications subsystem communicative with the telemetry subsystem and comprising a processor and a memory having encoded thereon program code executable by the processor to read measurement data from the sensor and send the measurement data to the uplink transceiver subassembly to encode into microwave communication signals for transmission to an adjacent upstring communications node.

At least one of the communications nodes can further comprise a communication subsystem communicative with the transceiver of that node and having a processor and a memory having encoded thereon message buffering program code executable by the processor to store a message in the memory for a temporary period of time before the communication signal containing the message is transmitted by the transceiver.

BRIEF DESCRIPTION OF FIGURES

FIGS. 2(a) and (b) are perspective views of a first embodiment of a topside unit of the microwave communication system, wherein FIG. 2(a) is a transparent view of the topside unit and FIG. 2(b) is a longitudinally sectioned view of same. FIGS. 2(c) to (e) are perspective and side views of a second embodiment of a topside unit of the microwave communication system, wherein FIG. 2(c) is a transparent view of the topside unit and FIGS. 2(d) and (e) are longitudinally sectioned views of same.

FIGS. 3(a) and (b) are perspective views of a first embodiment of a repeater unit of the microwave communication system, wherein FIG. 3(a) is a transparent view of the repeater unit and FIG. 3(b) is a longitudinally sectioned view of same. FIGS. 3(c) to (e) are perspective and side views of a second embodiment of a repeater unit of the microwave communication system, wherein FIG. 3(c) is a transparent view of the repeater unit and FIGS. 3(d) and (e) are longitudinally sectioned views of same.

FIGS. 4(a) and (b) are perspective views of a first embodiment a repeater unit which comprises a telemetry and control subsystem, wherein FIG. 4(a) is a transparent view of the repeater unit and FIG. 4(b) is a longitudinally sectioned view of same. FIGS. 4(c) to (e) are perspective and side views of a second embodiment a repeater unit which comprises a telemetry and control subsystem, wherein FIG. 4(c) is a transparent view of the repeater unit and FIGS. 4(d) and (e) are longitudinally sectioned views of same.

FIGS. 5(a) and (b) are perspective views of a first embodiment of a repeater unit which comprises an obstruction receptacle, wherein FIG. 5(a) is a transparent view of the repeater unit and FIG. 5(b) is a longitudinally sectioned view of same. FIGS. 5(c) to (e) are perspective and side views of a second embodiment of a repeater unit which comprises an obstruction receptacle, wherein FIG. 5(c) is a transparent view of the repeater unit and FIGS. 5(d) and (e) are longitudinally sectioned views of same.

FIGS. 6(a) and (b) are perspective views of a first embodiment of a bottom hole unit of the microwave telemetry system, wherein FIG. 6(a) is a transparent view of the bottom hole unit and FIG. 6(b) is a longitudinally sectioned view of same. FIGS. 6(c) to (e) are perspective and side views of a second embodiment of a bottom hole unit of the microwave telemetry system, wherein FIG. 6(c) is a transparent view of the bottom hole unit and FIGS. 6(d) and (e) are longitudinally sectioned views of same.

DETAILED DESCRIPTION

Figure 1:
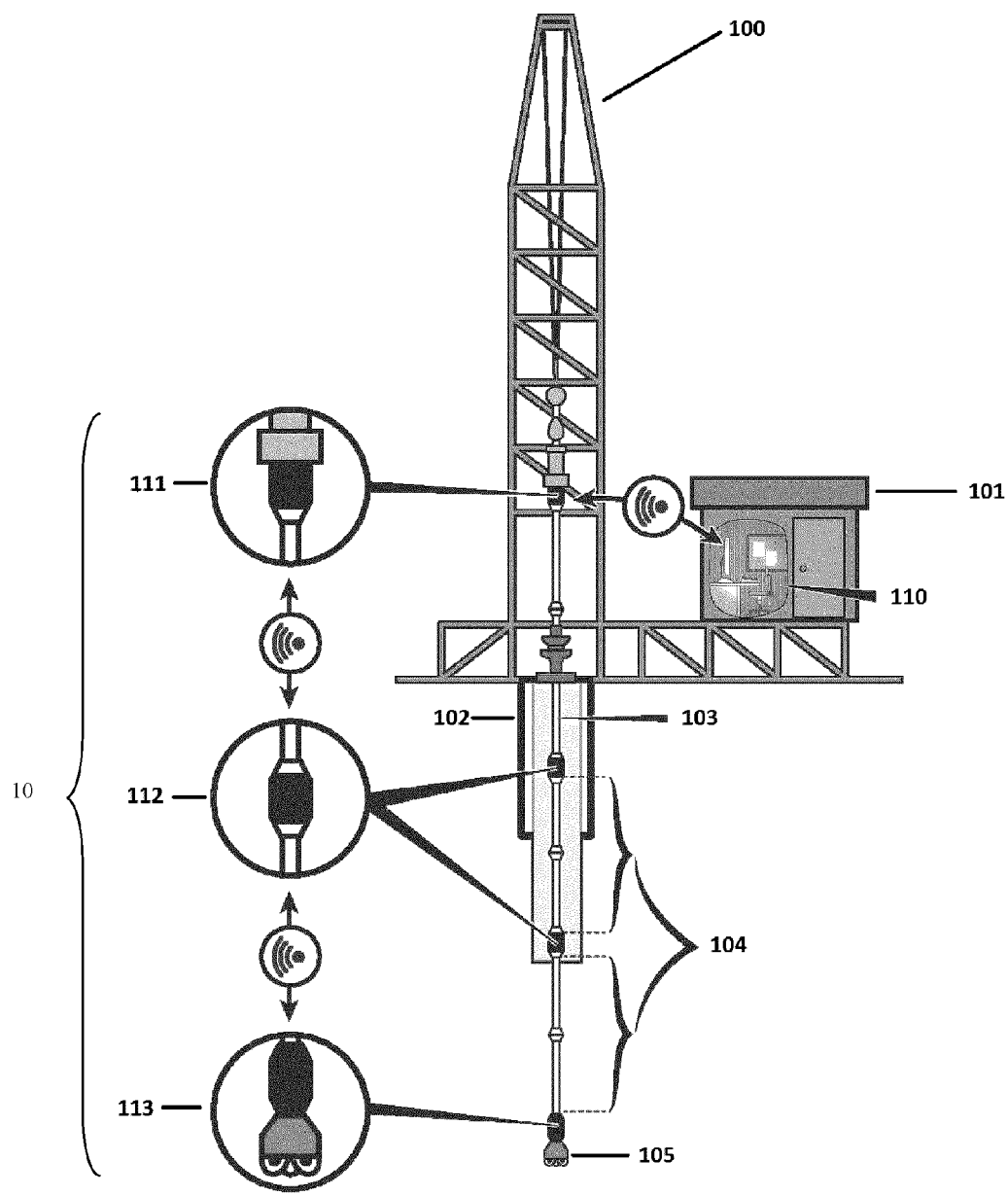
FIG. 1 is a schematic of a microwave communication system according to one embodiment of the invention, shown incorporated into an air drilling rig and connected to a drill string.

Directional terms such as "above", "below", "uphole", "downhole", "upstring" and "downstring" are used in the following description to provide relative reference only, and are not intended to suggest any limitations on how any article is to be positioned during use, or to be mounted in an assembly or to an environment. In particular, it is to be understood that "downhole" in the context of drilling includes drilling in vertical, horizontal and other directions.

Overview

Embodiments of the present invention described herein relate to a bidirectional microwave communication system for use in downhole drilling operations, and which is particularly suitable for use in air drilling operations wherein the system uses drill pipe of the drill string to serve as an air-filled, circular waveguide that supports microwave propagation. The system comprises a plurality of microwave communication nodes, namely: a topside unit at surface, a bottom hole unit mounted at or around a bottom hole assembly (BHA) of the drill string, and optionally one or a plurality of repeater units mounted along the drill string in between the topside and bottom hole units. The system also includes a telemetry and control interface at surface which is communicative with the topside unit. The communication nodes cooperate to wirelessly receive and transmit telemetry and control signals (collectively "communications signals") bidirectionally along the drill string using microwave signals. The telemetry signals can include MWD and LWD data collected by downhole sensors and transmitted to surface, and the control signals can include commands transmitted from surface to the BHA relating to the drilling inclination, direction and speed of the drill bit, or to the repeater or bottom hole units to operate aspects of these units or devices coupled to these units, such as a valve.

The topside unit is provided with a downlink microwave transceiver subassembly and a surface transceiver subassembly, the bottom hole unit is provided with a uplink microwave transceiver subassembly, and each optional repeater unit is provided with a pair of microwave transceiver subassemblies, namely an uplink transceiver subassembly and a downlink transceiver subassembly. The uplink and downlink transceiver subassemblies of each repeater unit can be configured to operate at different microwave frequencies, (otherwise referred to as "channels") to reduce interference with each other. The downlink transceiver subassembly of the topside unit and the uplink transceiver subassembly of the first repeater unit downstring and adjacent the topside unit communicate with each other and are configured to operate at a first microwave frequency and form a first communication segment of the system. Similarly, the downlink transceiver subassembly of the first repeater unit and the uplink transceiver subassembly of the second repeater unit downstring and adjacent the first repeater unit form a second communications segment and is configured to operate at the first microwave frequency, or at a second different microwave frequency (channel). The system can comprise multiple communication segments extending all the way to the bottom hole unit, wherein all of the communications segments can be operate at the same frequency or some or all of the communication segments can operate at different frequencies. The microwave frequency for each communication segment can be selected to minimize interference with the frequencies of adjacent communication segments, and/or be optimized for physical properties of the drill string segment and operating conditions of that communication segment.

The system is provided with a signal reflector in each of the repeater units, topside unit and bottom hole unit. The signal reflector has a structure that impedes microwave propagation yet allows fluids such as mist, air and foam to flow therethrough; this design is intended to reduce signal interference from other communication segments in the system without interfering with the drilling operation.

The system in some embodiments is provided with one or more of repeater units having uplink and downlink transceiver subassemblies that are spaced apart from each other such that a receptacle is formed between the transceiver subassemblies that can receive an obstruction in the drill pipe such as a one way valve. The spaced transceiver subassemblies are communicatively coupled across the receptacle by a hardwired connection; this arrangement effectively neutralizes the obstruction from interfering with communications along the drill string, since one transceiver subassembly will receive a wirelessly transmitted communications signal and convey this received signal via the hardwired connection to the other transceiver subassembly in the repeater unit, thereby physically bypassing the obstruction.

The system in some embodiments is provided with one or more repeater units and/or bottom hole unit that are equipped with telemetry sensors to collect measurement data; such repeater and bottom hole units are provided with a processor communicative with the sensors and comprise a memory having encoded thereon program code executable by the processor to read the measurement data from the sensors and wirelessly transmit this measurement data along with other data to the next communications node. The memory can be further programmed with message buffering program code which when executed will store (buffer) received measurement signals for a temporary period of time, then wirelessly transmit the buffered measurement signals to the next communications node; such buffering can be particularly useful during periods when it is not suitable to transmit microwave signals along the drill string, e.g. when a drill pipe segment is added to the drill string.

The system in some embodiments is provided with one or more repeater units and/or bottom hole unit that is communicative with a controllable device such as a valve; such repeater and bottom hole units are provided with a processor communicative with the controllable device and comprise a memory having encoded thereon program code executable by the processor to read a control signal received by the repeater and/or bottom hole unit and control the controllable device according to this control signal.

The system can be employed in a number of different drillings applications, including but not restricted to: oil and gas, mining, utility, and geothermal applications. For each of these applications, the system can be used to relay formation, trajectory and drilling process information from points along the drill string including the BHA to the operator's surface telemetry and control interface, and control information from the operator's surface telemetry and control Interface to points along the drill string including the BHA.

In oil and gas exploration, the system can be employed for geosteering, MWD and LWD, especially for directionally and vertically drilling natural gas and oil wells.

In mining applications, the system can be used for both exploration and resource extraction purposes, and in both surface and subsurface applications. During exploration, the system can be used for both directional and straight drilling, and can be employed to obtain formation information and geological samples, including repeating MWD and LWD information to the drilling operator. Geosteering based on formation data gathered by sensors at the BHA and along the drill string can be performed using the system; this is advantageous because varying formation structure necessitates identifying preferred zones for resource extraction.

MWD using formation sensors while straight and directional drilling offers an alternative to core sampling for faster evaluation of the formation, further enabling targeted core sampling directed at the most resource rich zones. Also, borehole imagery, using radar and/or ultrasonic methods for example, can also be gathered using the system. During a production process, the system can be used during drilling to identify formation properties which impact the extraction process. For example, in open pit mining, MWD while drilling blast holes helps optimize explosives placement for the removal of overburden, reducing resource waste. In addition, MWD while directional drilling around the open pit allows for efficient probing to identify the most resource rich zones to extract, while identifying zones to avoid which are inefficient to extract and process. In addition, MWD employing formation sensors can enable directional drilling as an efficient resource extraction method, by guiding the directional drilling process to extract only the richest portions of the formation.

In utility drilling applications, the system can be utilized for MWD while directionally drilling boreholes for urban utilities distribution and for rural applications, such as drilling to establish utility river crossings.

The system can also be employed for geothermal directional drilling purposes, where MWD and LWD are required. Boreholes used to extract the earth's heat often require directional drilling because topographic or legal issues prevent the drill rig from being directly over the geologic target. It addition, it is economical to directionally drill several wells from one prepared site, and advantageous for boreholes to intersect as many formation fractures as possible.

System Structure

Referring now to FIGS. 1 to 8, a microwave communication system 10 is employed in an air drilling operation. As will be described below, this system 10 is provided with a number of features for improving communication along a drill string of the air drilling operation, including: communication segments operating at different frequencies, communication nodes having microwave signal reflectors, telemetry sensors, and message buffering capability, and repeater units having obstruction receptacles. It is understood that other embodiments can feature only one or more of these features in different combinations. FIGS. 2(a),(b), 3(a),(b), 4(a),(b), 5(a),(b), 6(a),(b) and 7(a),(b) refer to a first embodiment wherein electronic components of the topside, repeater and downhole units of the system 10 are housed in a cavity of a sub of those units. FIGS. 2(c)-(e), 3(c)-(e), 4(c)-(e), 5(c)-(e), 6(c)-(e), and 7(c)-(e) refer to a second embodiment wherein electronic components of the topside, repeater and downhole units of the system 10 are housed in a separate cylindrical enclosure suspended in a central bore of the sub.

It is understood that this system 10 is not restricted to just air drilling operations and can be employed in other types of drilling operations such as mud drilling. Further, the air drilling can be performed "dry" wherein nothing is added to the dry air, or "with mist" wherein a small amount of mist is added to the dry air, or "with foam" wherein a foam is added to the dry air.

Referring particularly to FIG. 1, the microwave communication system 10 is shown employed at an air drilling rig 100 that suspends a drill string 103 comprising interconnected drill pipes into a borehole 102. The drill string 103 has at its terminal end a bottom hole assembly (BHA) 105, which comprises a rotary steerable system, LWD and/or MWD modules (if not already incorporated into the bottom hole unit), and a drill bit assembly having a drilling motor. At surface and near the rig 100 is a control centre 101. The rig 100 includes a platform and drilling rig assembly positioned over the borehole 102. The rig 100 includes a top head drive unit (not shown) which suspends and rotates the drill string 103.

The microwave communications system 10 comprises a telemetry and control interface 110 located in the control centre 101 and a plurality of communication nodes mounted along the drill string 103. The communication nodes are operable to wirelessly transmit communications signals via microwave transmissions, and in this embodiment comprises: a topside unit 111, one or more repeater units 112, and a bottom hole unit 113. In an alternative embodiment (not shown), the system 10 comprises only the topside and bottom hole units 112, 113 as communication nodes, i.e. there are no repeater units. Such an alternative embodiment can be useful in applications utilizing a relatively short drill strength length where a microwave signal can be transmitted between the topside and bottom hole units 111, 113 without the need for a repeater unit 112.

The topside unit 111 is mounted to around the top of the drill string 103, and is provided with a surface transceiver subassembly that is communicative by wired or wireless means with the telemetry and control interface 110, and a downlink microwave transceiver subassembly for sending and receiving microwave signals to and from a down-string location. The repeater units 112 are spaced along the drill string 103, and each repeater unit 112 is provided with an uplink microwave transceiver subassembly for sending and receiving microwave communications up-string and a downlink microwave transceiver subassembly for sending and receiving microwave communications down-string. The bottom hole unit 113 is located on the drill string 103 below the repeaters 112 and is communicative with the MWD/LWD sensors of the bottom hole assembly 105 (if such sensors are present in the BHA 105), and is provided with an uplink microwave transceiver subassembly that sends and receives microwave communications to and from an up-string location.

The telemetry and control interface 110 comprises a processor and a memory having stored thereon a database containing configuration and operational data of the system 10. Configuration data includes a list of all of the communications nodes 111, 112, 113 present in the system 10, operational capabilities and settings of each node 111, 112, 113, and a representation of the communications linkages between each node 111, 112, 113. Operational data includes telemetry and control data records for all telemetry inputs and control outputs for the topside, repeater and bottom hole units 111, 112, 113, as well as supervisory information such as battery condition and transceiver signal strength measurements. The operational data also includes a record of operator commands. The database is historical in nature and maintains a time-based log of configuration and operational data, stored over time as updates and changes occur. The telemetry and control interface 110 is operated by an operator (not shown). The telemetry and control interface 110 is provided with display and input means to allow the operator to observe the system telemetry data and exercise control over the system 10 in a manner that will be described in further detail below.

Topside Unit

Figures 2A, 2B:
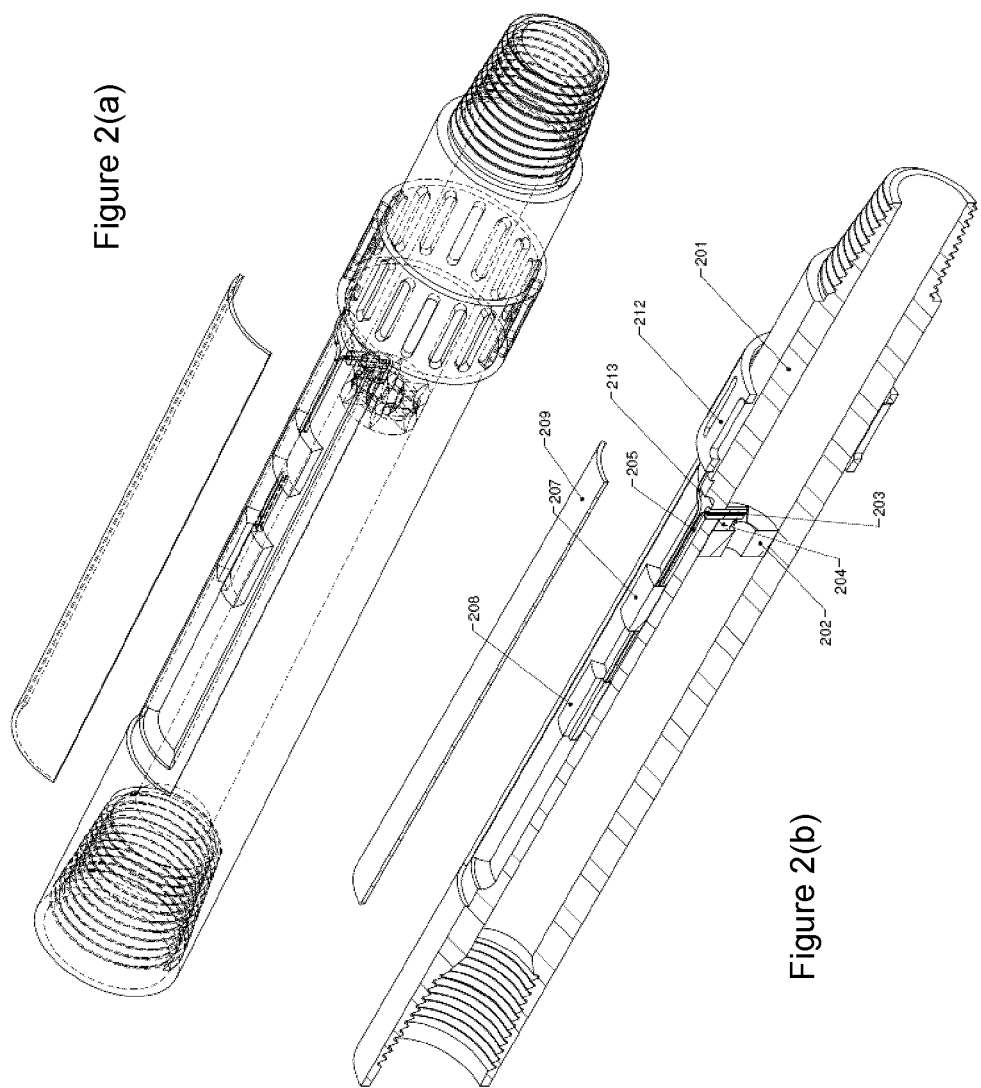
Figure 2E:
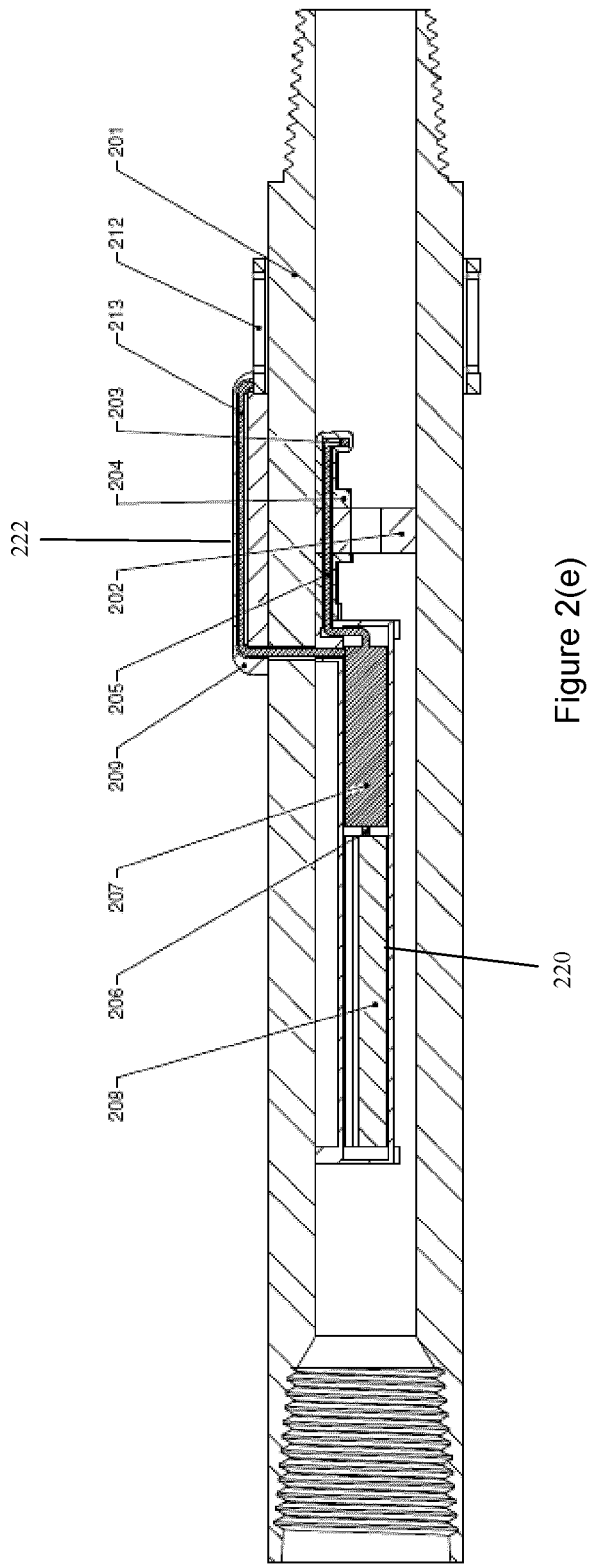

Referring particularly to FIGS. 2(a)-(e), the topside unit 111 comprises a tubular sub 201 having connecting ends, namely a male threaded downstring end and a female threaded upstring end. The sub's diameter and threaded ends are configured to mate with standard drill pipe used in the drill string 103, and in particular, the female end of drill pipe sub 201 is mounted to the top head unit and the male end of the sub 201 is coupled to the top of the drill string 103 such that the drill string 103 is suspended from and rotates with the topside unit 111. In the first embodiment of the topside unit 111 as shown in FIGS. 2(a), (b), the sub 201 has a tubular body that provides an axial through-bore for air, mist and other fluids to flow therethrough, and an electronics compartment which is a cavity on the outside of the tubular body that houses a communications subsystem 207 and a power subsystem 208; an external cover 209 is provided which covers and provides access to the inside of the electronics compartment. A drill string antenna feed support 204 is a tubular structure that extends radially through the sub's body from the inner surface of the sub 201 to the electronics compartment, and serves to protect and hold in place a microwave antenna feed 203 which is communicatively coupled to the communications subsystem 207 by a drill string antenna cable 205. The topside unit 111 also comprises an annular surface antenna 212 mounted around the outside of the sub body and communicatively coupled to the communications subsystem 207 by a surface antenna cable 213; the surface antenna 212 is used for wireless communication between the topside unit 111 and the telemetry and control interface 110 using Bluetooth™ or another suitable wireless communication protocol. The communications subsystem 207 includes a surface transceiver circuit for encoding data and decoding signals; the transceiver circuit along with the surface antenna 212 and surface antenna cable 213 form the surface transceiver subassembly. The second embodiment of the topside unit as shown in FIGS. 2(c)-(e) is similar to the first embodiment except that a cylindrical enclosure 220 is provided for housing the electronics instead of the electronics compartment in the tubular body of the sub 201. Modifications to accommodate this different design also include: providing a radial bore through the tubular body to allow the surface antenna cable 213 to communicate with the communications subsystem 207 in the cylindrical enclosure 220; providing an antenna cable enclosure 222 on the outside of the sub 201 that encloses the surface antenna cable 213; and providing a modified antenna feed support 204 that routes the drill string antenna cable 205 from the communications subsystems 207 to the microwave antenna feed 203.

In both embodiments, the topside unit 111 is mounted to the drill string just beneath a top drive unit. In alternative embodiments, the topside unit can be mounted in a different manner; for example, the topside unit can be connected to an inlet hose of the top drive unit (not shown). Or (also not shown), the topside unit 111 can be fixedly mounted to the rig 100, and does not rotate with the drill string 103. In such case, the topside unit 111 can be optionally provided with a wired connection (not shown) between the topside unit 111 and the telemetry and control interface 110 instead of or in addition to the surface antenna 212.

The power subsystem 208 comprises batteries which provide power to the communications subsystem 207 via power cable 206 to generate wireless communication signals and power other components in communications subsystem 207. The batteries can be single use or rechargeable; when rechargeable batteries are used, associated charging control equipment (not shown) is also provided. The communications subsystem 207 comprises a central controller, a downhole transceiver circuit communicative with the controller and with the antenna feed 203 via cable 205, and a surface transceiver circuit communicative with the controller and with the telemetry and control interface 110 (either wirelessly or by wired means). The downhole transceiver circuit contains a processor and a memory having encoded thereon encoder program code that is executable by the processor to encode a digital data stream received from the telemetry and control interface 110 into a microwave communication signal, which is then amplified by the downhole transceiver circuit and radiated by the antenna feed 203. The memory also contains decoder program code which is executable by the processor to decode a microwave signal received by the antenna feed 203 into a digital data stream for transmission by the surface transceiver circuit to the telemetry and control interface 110.

The central controller comprises a memory that is encoded with program code executable by the processor to parse a data stream received from the telemetry and control interface 110 to determine whether the data stream contains local control instructions to be carried out by the topside unit 111 (e.g. power management instructions relating to use of the batteries in the power subsystem) and/or instructions that should be relayed to the next communications node. In the latter case, the central controller will transmit the data stream to the wireless transceiver circuit for encoding and transmission to the adjacent downhole communications node.

Optionally, the central controller can comprise a memory that is encoded with a message buffering program code that when executed by the controller will temporarily store the data streams in the memory for transmission to the adjacent downstring communication node at a later time. The message buffering program code is executed when the topside unit 111 does not receive a confirmation signal from the downhole adjacent communications node after the topside unit 111 has sent a downlink transmission to that communications node; the failure to receive the confirmation signal is assumed to be a result of an interrupting event that prevented the confirmation signal from reaching the topside unit, e.g. the installation of a new drill pipe in between the downhole communications node and the topside unit 111. The message buffering program code will temporarily store the data stream in the memory and at some predetermined time resend a downlink transmission carrying the data stream; if the interrupting event is over, the downhole adjacent communications node will receive this downlink transmission and send a confirmation signal back to the topside unit 111.

As can be seen in FIGS. 2(a)-(e) and in more detail in FIGS. 7(a)-(e) and FIG. 8, the topside unit 111 further comprises a microwave reflector 202 located immediately above (up-string) the antenna feed 203. The reflector 202 in this embodiment is composed of a conductive material to reflect microwave signals, such as copper or steel. The reflector 202 comprises an annular inner hub and an annular outer hub and a series of radial spokes radiating between the inner and outer hubs. The spaces in between the spokes define apertures that are selected to impede the passage of microwave frequencies below a selected cut-off frequency threshold, as well as allow fluid flow therethrough, e.g. air, mist and foam. The inner hub defines an axial through-bore that allows passage of fluids such as air, mist and foam to flow therethrough; the size of the through-bore is also selected to impede microwave frequencies below the selected cut-off frequency. The pattern or hub and spokes is optimized for microwave cut-off frequency, fluid flow and mechanical strength.

The antenna feed 203, transceiver circuit of the communication subsystem 207, power subsystem 208 and the interconnecting communication and power cables 205, 206 collectively form the microwave transceiver subassembly of the topside unit 111. This transceiver subassembly is configured to transmit and receive microwave signals at an operating frequency that is below the selected cut-off frequency threshold of the reflector 202 ("operating frequency"). The adjacent downstring repeater unit 112 will have its uplink transceiver subassembly configured to transmit and receive microwave signals at the same operating frequency. The topside unit 111 and the adjacent downstring repeater units 112 thus function as a first communications segment of the system 10 (shown as 104 in FIG. 1). The antenna feed 203 is located downstring of the reflector 202 such that any microwave signal transmitted at the operating frequency by the adjacent downstring repeater unit 112 will be reflected constructively by the reflector 202, thereby enhancing signal reception at the antenna feed 203. Not only does the reflector beneficially enhance signal reception of the microwave signals at the operating frequency, it also serves to prevent unwanted frequencies from reflecting back from structures upstring of the antenna and interfering with signal reception (which would otherwise occur if the reflector 202 was not present). In the first embodiment (see in particular FIGS. 7(a), (b)), the drill string antenna cable 205 is coupled to the antenna feed 203 via a radial through bore in the tubular body of the sub 201; in the second embodiment (see in particular FIGS. 7(c)-(e)), the drill string antenna cable 205 is coupled to the antenna feed 203 via a through bore in the body of the reflector 202.

Repeater Units

Different types of repeater units 112 can be used in the system 10, including: a basic repeater unit 112 as shown in FIG. 3, a repeater unit 112 with a telemetry subsystem as shown in FIG. 4, and a repeater unit 112 for use around obstructions as shown in FIG. 5. Like the topside unit 111, each type of repeater unit has two embodiments, as will be described in more detail below.

Figures 3A, 3B:
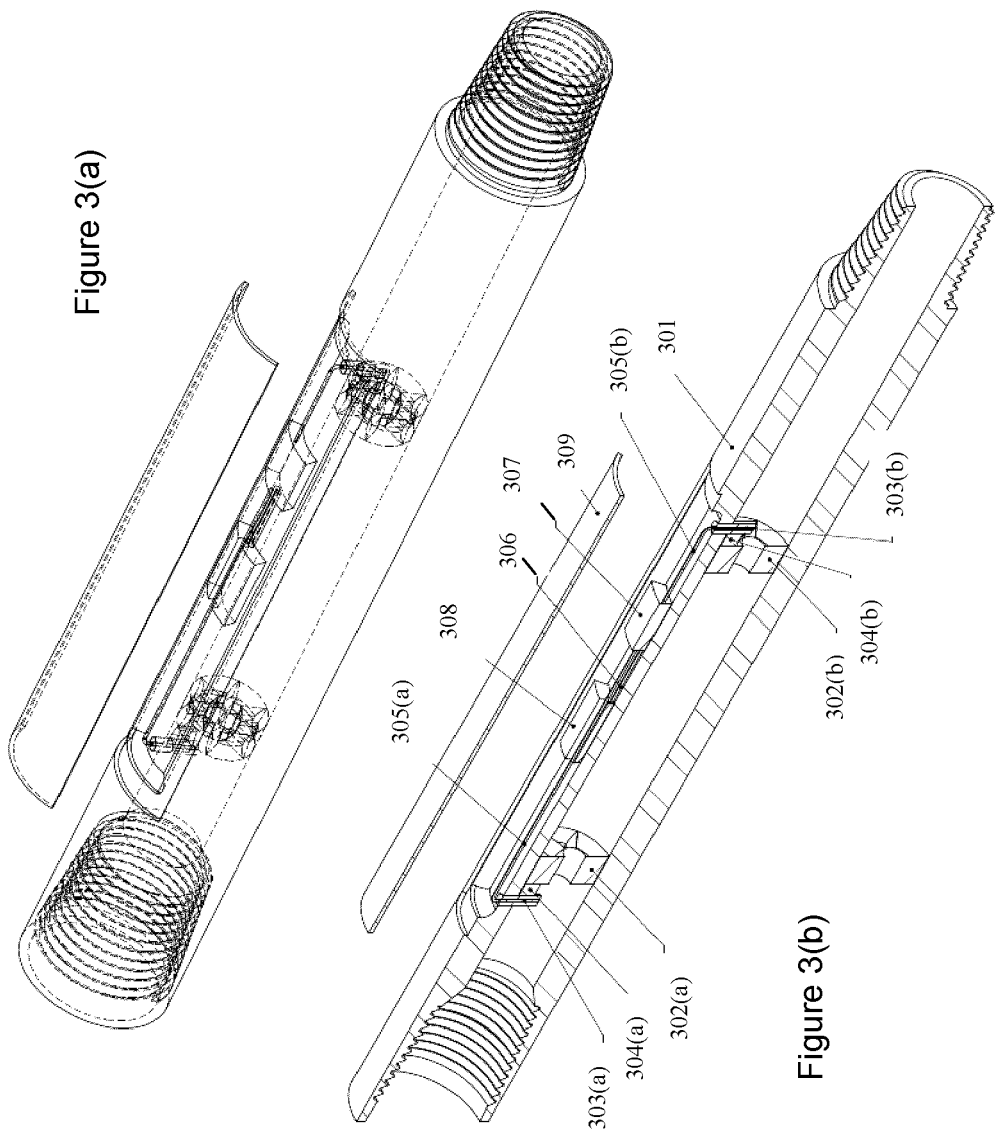

Referring now to FIGS. 3(a) and (b), a first embodiment of the basic repeater unit 112 comprises a tubular sub 301 having connecting ends, namely, a male threaded downstring end and a female threaded upstring end. The sub's diameter and threaded ends are configured to mate with standard drill pipe used in the drill string 103. Like the topside unit 111, the sub 301 has a tubular body that provides an axial through-bore for air, mist and other fluids to flow therethrough, and an electronics compartment in the tubular body of the sub 301 with a cover 309 housing a communications subsystem 307 and a power subsystem 308. Unlike the topside unit 111, the repeater unit 112 does not contain a surface antenna and instead comprises a pair of drill string antenna feed supports 304(a), 304(b) each extending radially through the sub's body into a respective downstring end and upstring end of the electronics compartment (respectively referred to as "downlink feed support" and "uplink feed support"). A downlink and uplink microwave antenna feed 303(a), 303(b) are each fixed within each respective downlink and uplink support 304(a), 304(b) such that the two antenna feeds 303(a), 303(b) are longitudinally spaced from each other along the length of the sub 301; each antenna feed 303(a), 303(b) is communicatively coupled to the communications subsystem 307 by a respective downlink and uplink antenna cable 305(a), 305(b). The communication subsystem 307 comprises a central controller along with an uplink transceiver circuit communicative with the central controller and with the uplink antenna cable 305(a), and a downlink transceiver circuit communicative with the central controller and with the downlink antenna cable 305(b). The uplink feed support 304(a), uplink antenna feed 303(a), uplink antenna cable 305(a) and uplink transceiver circuit collectively form an uplink transceiver subassembly of the repeater unit 112, and the downlink feed support 304(b), downlink antenna feed 303(b), downlink antenna cable 305(b), and downlink transceiver circuit collectively form a downlink transceiver subassembly of the repeater unit 112. Both uplink and downlink transceiver subassemblies are controlled by the central controller of the communications subsystem 307 and powered by the power subsystem 308.

Figure 3E:
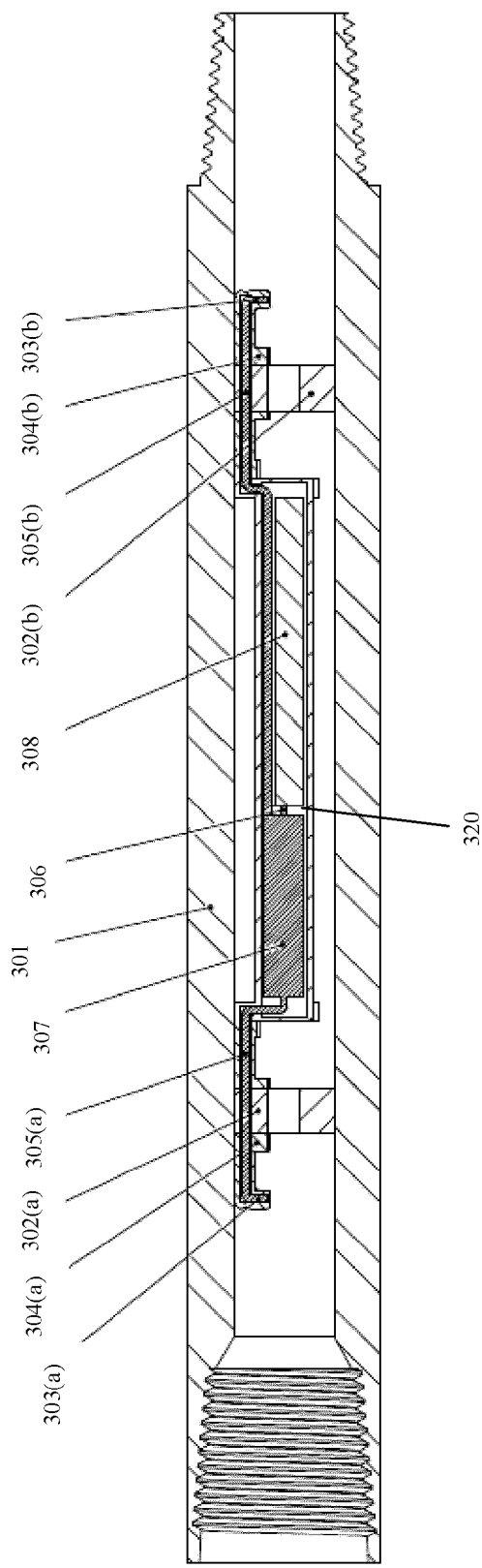
Figure 4E:
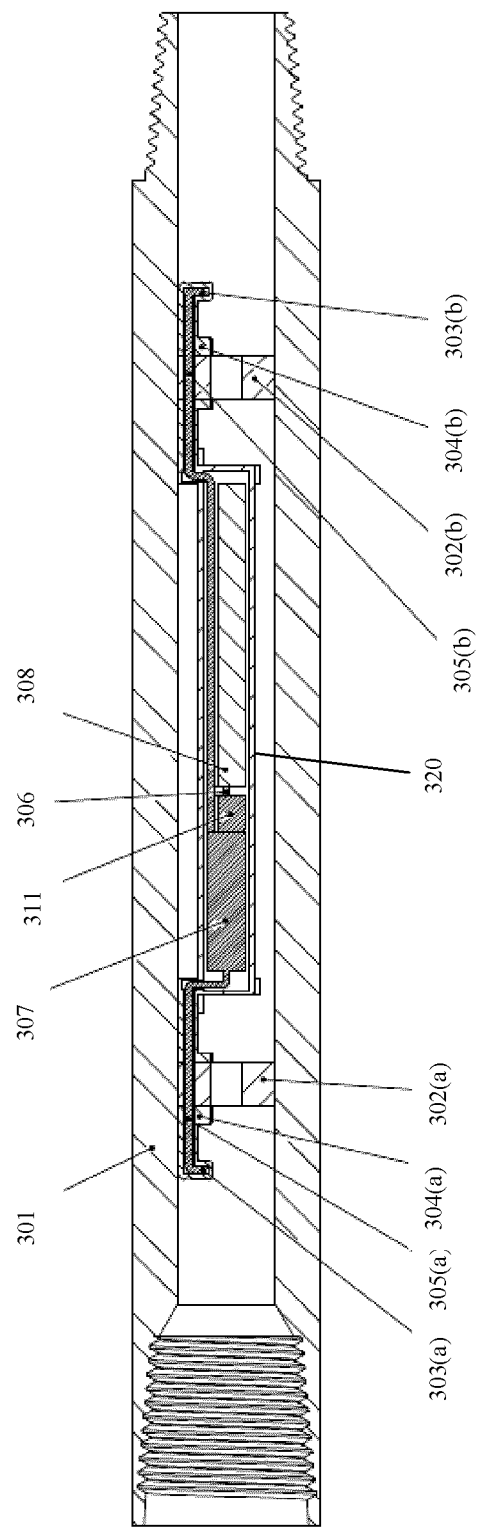
Figures 5C, 5D:
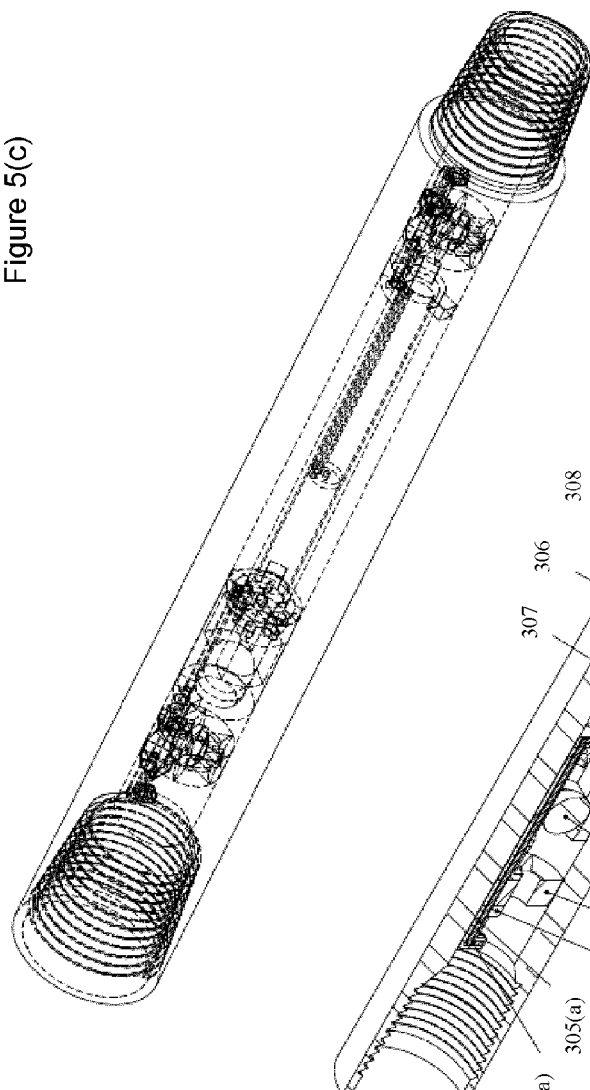
Figure 5E:
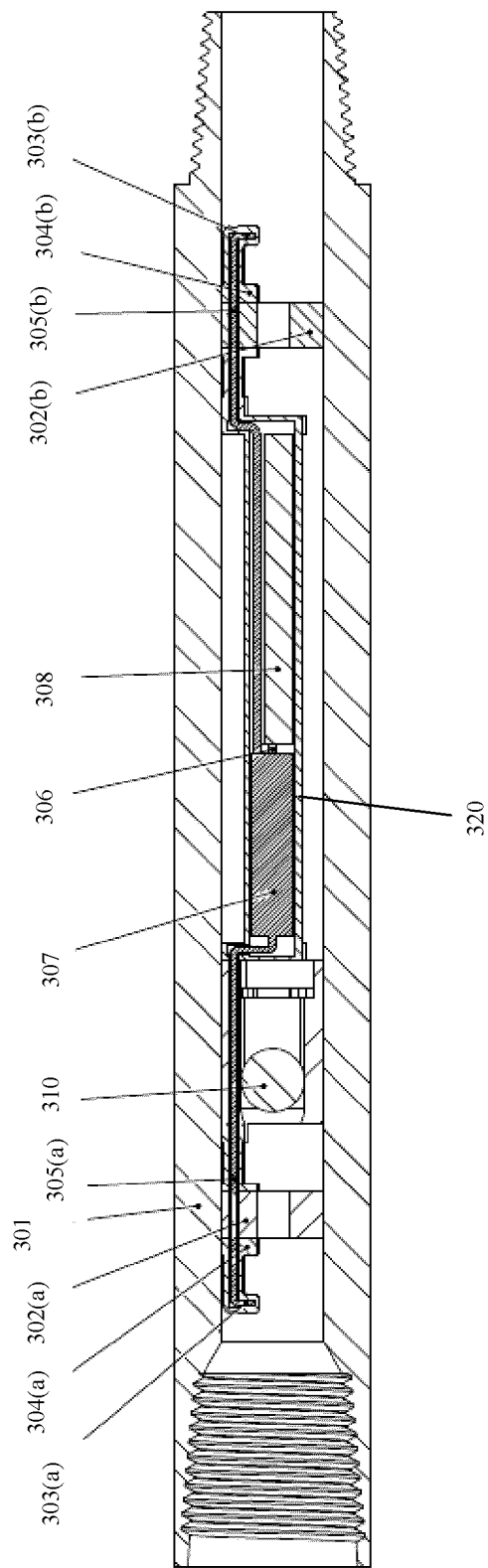

The second embodiment of the repeater unit is shown in FIGS. 3(c)-(e) and is similar to the first embodiment except that an enclosure 320 is provided for housing the electronics instead of the electronics compartment in the tubular body of the sub 301. Modifications to accommodate this different design also include providing a modified antenna feed support 304 that routes the uplink and downlink drill string antenna cables 305(a), (b) from the communications subsystem 207 to the uplink and downlink microwave antenna feeds 303(a), (b).

The repeater unit 112 also comprises a pair of microwave reflectors, namely a downlink reflector 302(b) mounted inside the sub 301 immediately upstring of the downlink antenna feed 303(b), and an uplink reflector 302(a) mounted inside the sub 302 immediately downstring of the uplink antenna feed 303(a). Each reflector 302(a), 302(b) has the same design to the topside unit reflector 202, having inner and outer hubs interconnected by a plurality of radial spokes, and thus are configured to impede passage of microwave frequencies below the selected cut-off frequency. Each of the uplink and downlink reflectors 302(a), 302(b) are positioned at a selected distance from the antenna feeds 303(a), 303(b) such that the reflectors 302(a), 302(b) constructively reflect back the microwave signals towards their respective antenna feeds 303(a), 303(b) thereby enhancing signal reception.

In an alternative embodiment (not shown), each repeater reflector 302(a), 302(b) is configured to block a different range of microwave frequencies than the topside unit reflector 202. More particularly, the uplink reflector 302(a) will be configured to block a range of frequencies that include the operating frequency of the uplink transceiver, such that microwave signals at this operating frequency transmitted downstring by the adjacent upstring communication node will reach the uplink antenna feed 303(a) but will be blocked by the uplink reflector 302(a) from reaching the downlink antenna feed 303(b). Conversely, the downlink reflector 302(b) will be configured to block a range of frequencies that include the operating frequency of the downlink transceiver, such that microwave signals at this operating frequency transmitted upstring from the adjacent downstring communication node will reach the downlink antenna feed 303(b) but will be blocked by the downlink reflector 302(b) from reaching the uplink antenna feed 303(a).

In yet another alternative embodiment (not shown), a single reflector can be provided in place of the uplink and downlink reflectors; this single reflector would be located between the uplink and downlink antenna feeds 303(a), 303(b) and can be the same design as the topside reflector 202 or be configured with apertures that allow the passage of fluids but block a different frequency range that would still include both the uplink and downlink operating frequencies.

Power is supplied from the power subsystem 308 to the communications subsystem 307 via power cable 306. Like the transceiver in the topside unit 111, each of the uplink and downlink transceiver circuits contain a processor and a memory having encoded thereon encoder program code that is executable by the processor to encode a digital data stream received from the central controller into a microwave communication signal, which is then amplified by that transceiver and radiated by the antenna feed 303 as microwave signals. The memory also contains decoder program code which is executable by the processor to decode microwave signals received by the antenna feed 303(a), 303(b) of that transceiver into a digital data stream for transmission to the central controller. The central controller also contains a processor and a memory having encoded thereon program code executable by the processor to parse this data stream to determine whether the data stream contains local control instructions to be carried out by the repeater unit 112 (e.g. power management instructions relating to use of the batteries in the power subsystem) and/or instructions that should be relayed to the next communications node. In the latter case, the central controller will transmit the data stream to the other transceiver for encoding and transmission to the next communications node.

Optionally, the controller can comprise a memory that is encoded with a message buffering program code that when executed by the controller will temporarily store the data streams in the memory for transmission to the adjacent downstring communication node at a later time. The message buffering program code is executed when the uplink or downlink transceiver circuit does not receive a confirmation signal from a respective uphole or downhole adjacent communications node after the repeater unit 112 has sent an uplink or a downlink transmission to that communications node; the failure to receive the confirmation signal is assumed to be a result of an interrupting event that prevented the confirmation signal from reaching the repeater unit 112, e.g. the installation of a new drill pipe in between the adjacent communications node and the repeater unit 112. The message buffering program code will temporarily store the data stream in the memory and at some predetermined time resend the uplink or downlink transmission carrying the data stream; if the interrupting event is over, the adjacent communications node will receive this uplink or downlink transmission and send a confirmation signal back to the repeater unit 112.

As noted previously, the operating frequency of each of the uplink and downlink transceivers will be configured to match the operating frequency of the transceiver in the adjacent communications node, but will be configured to be different from each other so as to minimize interference. The communication subsystem 307 can be considered to be a bidirectional data bridge between the uplink and downlink transceivers that serves to repeater the decoded communications signal between the transceivers in the repeater unit 112.

Referring to FIGS. 4(a)-(e), the repeater unit 112 with telemetry subsystem resembles the basic repeater unit 112 but further includes a telemetry subsystem 311 comprising sensors for measuring drilling parameters. The sensors can include sensors typically found in MWD subs, such as pressure, gamma and vibration sensors. The controller of the communication subsystem 307 is programmed to read measurement data collected by the sensors, and either encode this measurement data into a microwave communications signal for transmission as a microwave signal to the next communications node, or to combine this data with the data stream decoded from a received microwave communication signal before encoding and transmission.

Referring to FIGS. 5(a)-(e), the repeater unit 112 for use with obstructions resembles the basic repeater unit 112 but further includes a receptacle configured to receive an obstruction such as a one-way valve 310 of the drill string (not shown). The receptacle is a space in the tubular sub 301 between the uplink and downlink transceivers that is sized to receive the obstruction. The one-way valve 310 is a mechanical valve that allows pressurized air to flow in a downstream direction only through the drill string 103 during an air drilling operation. Although the one-way valve is a necessary component of the air drilling operation, it presents an obstruction to wireless communications along the drill string 103. By locating the one-way valve 310 in the receptacle, the one-way valve is effectively bypassed by transmitting communication signals by a hardwired connection between the uplink and downlink transceivers.

A fourth type (not shown) of a repeater unit can also be used with the system 10 and resembles the basic repeater unit 112 but further includes a hardwired connection to a controllable device such as an air drilling control valve. The central controller memory has encoded thereon program code executable by the processor to parse a data stream decoded from a microwave communication signal to determine whether the data stream contains local control instructions for operating the controllable device and if yes, the controller will control the device in the manner specified by the control instructions.

Although not shown, other embodiments of the repeater unit can be provided which combine the features of the first to fourth types of the repeater unit 112. For example, a repeater unit can be provided which incorporates a telemetry subsystem of the second type and an obstruction receptacle of the third type.

The system 10 can comprise any one or more of these embodiments of the repeater units 112, and the use of any of these repeater units 112 will depend on factors such as the length of the drill string, the number of obstructions in the drill string, the number of controllable devices in the drill string, and the need to obtain telemetry data from various locations along the drill string.

Bottom Hole Unit

Figure 6E:
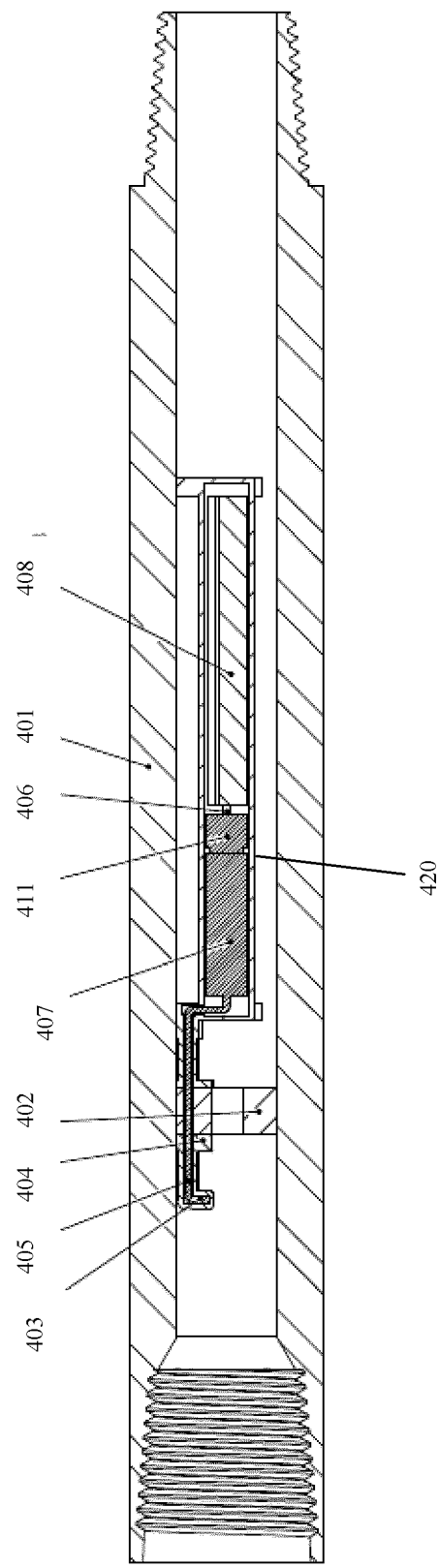
Figure 7A:
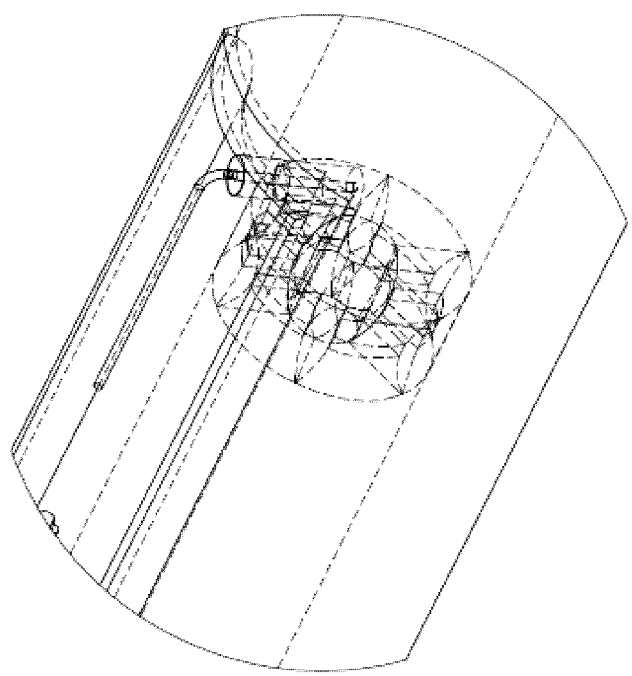
FIGS. 7(a) and (b) are perspective views of a first embodiment of a drill string antenna assembly that can be used in any of the topside unit, bottom hole unit, and repeater unit.
Figure 7B:
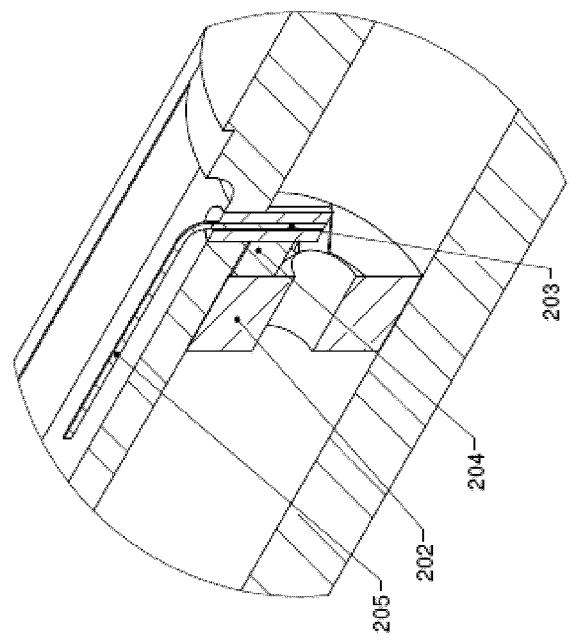
FIGS. 7(c) to (e) are perspective views of a second embodiment of same.
Figure 8:
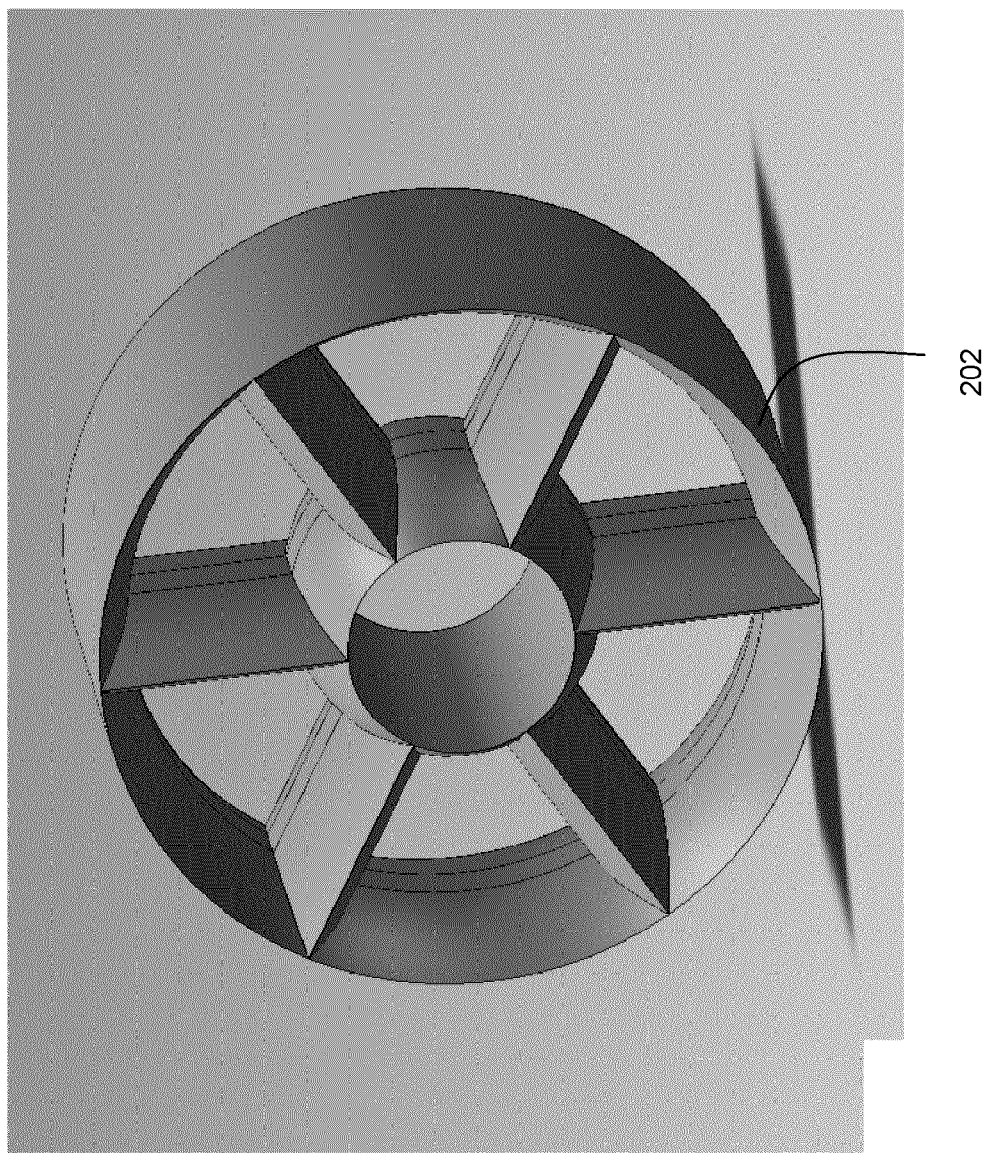
FIG. 8 is a perspective view of a reflector that can be used in any of the topside unit, bottom hole unit, and repeater unit.

Referring now to FIG. 6, the bottom hole unit 113 resembles the topside unit 111 except that it does not have a surface antenna. Like the topside unit 111, the bottom hole unit 113 comprises a sub 401 having connecting ends namely male and female threaded ends, an electronics compartment comprising a cover 409 and housing a power subsystem 408 and communications subsystem 407. The bottom hole unit 113 also comprises an uplink transceiver subassembly comprising a transceiver circuit, an antenna support 404, an antenna feed 403, and an antenna cable 405 coupling the antenna feed 403 to the communications subsystem 407. The bottom hole unit 113 also comprises a reflector 402 positioned downstring of the antenna feed 403, and having the same design as the reflector 202, 302(a), 302(b) in the topside unit 111 and repeater units 112. The communication subsystem 407 is programmed to transmit and receive communication signals at an operating microwave frequency that matches the frequency of the adjacent upstring repeater unit 112. The communication subsystem 407 is also programmed with a message buffering program that operates in the same manner as in the repeater unit 112. Like the topside unit 111, the bottom hole unit 113 comprises two embodiments, namely a first embodiment as shown in FIGS. 6(a),(b) wherein the electronic compartment is a cavity in a tubular body of the sub 401, and a second embodiment as shown in FIG. 6(c)-(e) wherein the electronics compartment is a separate enclosure that is suspended in a central bore of the sub 401. The designs for routing the antenna cable 405 to the antenna feed 403 in each of the first and second embodiment also resemble that of the topside unit 111.

Like the repeater unit 112 with telemetry subsystem, the bottom hole unit 113 comprises a telemetry and control subsystem 211 having sensors for reading MWD measurement data and/or LWD data which is transmitted to surface by the uplink transceiver. Alternatively, the bottom hole unit 113 can be communicative with MWD and/or LWD sensors in the BHA 105.

The central controller comprises a memory that is encoded with program code executable by the processor to parse a data stream received from the telemetry and control interface 110 to determine whether the data stream contains local control instructions to be carried out by the bottom hole unit 112 (e.g. power management instructions relating to use of the batteries in the power subsystem).

Installation

The telemetry and control system 110 includes program code that determines when a new repeater unit should be added to a drill string 103 that is being deployed downhole. As is well known in the art, a drill string is lengthened by adding successive drill pipe at the top head drive unit, until the drill bit reaches its intended destination. The system 10 is first installed on the rig by attaching the topside unit 111 to the top head drive unit and the bottom hole unit 113 to the drill string 103 above the BHA 105. Once the bottom hole unit is linked to the BHA 105 and the topside unit 111 is linked to the telemetry and control system 110, the system 10 can be activated to establish a wireless communications link between the topside unit 111 and the bottom hole unit 113. As the drill string 103 is lowered into the borehole 102, the microwave signals emitted by the bottom hole unit 113 will become progressively weaker when received by the topside unit 111. The telemetry and control system 110 is programmed to alert the operator when the strength of the microwave signals fall to a selected minimum threshold. In response to this alert, the operator will install a repeater unit 112 to the drill string 103; the downlink transceiver of the repeater unit 112 is programmed to establish a communications link with the bottom hole unit 112 at the same operating frequency as being utilized by the bottom hole unit's transceiver. The uplink transceiver of the repeater unit 112 is programmed to transmit a linking request at a different operating frequency, and the telemetry and control system 110 will instruct the topside unit's transceiver to change its operating frequency to match the operating frequency of this uplink transceiver. Once a communications link has been established between the topside unit 111 and the repeater unit 112, the drill string 103 is continued to be deployed by adding additional drill pipe until the strength of the microwave signals emitted by the uplink transceiver of the repeater unit 112 falls to the minimum threshold. At this point, the process of installing a new repeater unit 112 is repeated.

As the process of adding new repeater units 112 is repeated, multiple communication segments 104 are formed each with a different and unique operating frequency. For especially long drill strings, the same group of operating frequencies can be repeated after a certain interval, provided that the interval length is long enough that repeated channels do not interfere with the communications link. By splitting drill string communications in the system 10 into different communication segments 104, each communications segment can operate on an independent microwave communications channel. Thus signal frequency and strength can be optimized for each segment 104 and, which is expected to improve throughput and reliability of communications to and from the BHA 105.

Operation

Once the drilling operation commences, the system 10 can be operated to bidirectionally transmit data along the drill string 103. Measurement data can be collected from the bottom hole unit 113 and repeater units 112 equipped with telemetry sensors (and optionally from the BHA 105) and transmitted by the system to the telemetry and control interface 110 for review by the operator. The operator can also send commands to components of the system 10 such as directional drilling commands, or commands to manage power in one or more of the system's components. As the operating frequencies between adjacent communications nodes will be different, and as the reflectors in each communications node will block unwanted frequencies from propagating along the drill string, it is expected that wireless communications along the drill string 103 will be relatively reliable.

When the system 10 is used in an air drilling operation, there will be times during the operation that microwave communications can be interrupted, particularly when drill pipe is being added to the drill string 103. Each communications node will execute its message buffering program code when the node does not receive a confirmation reply from an adjacent communication node, to temporarily store communications data in its memory until the interruption is over.

While the illustrative embodiments of the present invention are described in detail, it is not the intention of the applicant to restrict or in any way limit the scope of the appended claims to such detail. Additional advantages and modifications within the scope of the appended claims will readily be apparent to those skilled in the art. The invention in its broader aspects is therefore not limited to the specific details, representative apparatus and methods, and illustrative examples shown and described. Accordingly, departures may be made from such details without departing from the spirit or scope of the general concept.

The invention claimed is:

1. A wireless communication system for use in downhole drilling, comprising a plurality of wireless communication nodes, including:
   (a) a topside unit mountable around a top of a drill string and comprising a tubular sub with an axial through-bore for flow of fluid therethrough, a microwave downlink transceiver subassembly mounted to the tubular sub and having a first antenna feed extending into the through-bore, and a microwave reflector mounted inside the through-bore and upstring of the first antenna feed and comprising at least one aperture configured to reflect a range of frequencies including an operating frequency of the downlink transceiver subassembly and to allow passage of fluid therethrough; and
   (b) a bottom hole unit mountable along the drill string downstring of the topside unit and comprising a tubular sub with an axial through-bore for flow of fluid therethrough, a microwave uplink transceiver subassembly mounted to the tubular sub and having a second antenna feed extending into the through-bore, and a microwave reflector mounted inside the through-bore and downstring of the second antenna feed and comprising at least one aperture configured to reflect a range of frequencies including an operating frequency of the uplink transceiver subassembly and to allow passage of fluid therethrough.

2. A system as claimed in claim 1 further comprising one or more repeater units mountable along the drill string between the topside and bottom hole units, each repeater unit comprising a tubular sub with an axial through-bore for flow of fluid therethrough, a microwave uplink transceiver subassembly mounted to the tubular sub and having an uplink antenna feed extending into the through-bore, a microwave downlink transceiver subassembly mounted to the tubular sub, communicatively coupled to the microwave uplink transceiver subassembly and having a downlink antenna feed extending into the through-bore, and at least one microwave reflector mounted inside the through-bore between the uplink and downlink antenna feeds and comprising at least one aperture configured to reflect a range of frequencies including the operating frequency of the uplink and downlink transceiver subassemblies and to allow passage of fluid therethrough.

3. A system as claimed in claim 2 wherein the downlink transceiver subassembly of the topside unit and the uplink transceiver subassembly of a repeater unit adjacent and downstring of the topside unit are configured to communicate wirelessly with each other at a same operating frequency and together form a first communications segment; the uplink transceiver subassembly of the bottom hole unit and the downlink transceiver subassembly of a repeater unit adjacent and upstring of the bottom hole unit are configured to communicate wirelessly with each other at a same operating frequency and together form a second communications segment; and when there are at least two repeater units, the downlink transceiver subassembly of a first repeater unit and the uplink transceiver subassembly of a second repeater unit adjacent and downstring of the first repeater unit are configured to communicate with each other at a same frequency and together form a third communications segment, and wherein at least two of the operating frequencies of the first, second and third communications segments are different from each other.

4. A system as claimed in claim 3 comprising multiple repeater units and the operating frequencies of each communication segment are different from each other.

5. A system as claimed in claim 3 wherein at least one of the one or more repeater units comprises an uplink microwave reflector mounted inside the through bore of the tubular sub downstring of the uplink antenna feed and a downlink microwave reflector mounted inside the through bore of the tubular sub upstring of the downlink antenna feed, wherein the uplink reflector is configured to reflect a range of microwave frequencies including the operating frequencies of the uplink transceiver and wherein the downlink reflector is configured to reflect a range of microwave frequencies including the operating frequencies of the downlink transceiver.

6. A system as claimed in claim 5 wherein the uplink reflector is positioned longitudinally along the through bore at a distance relative to the uplink antenna feed such that microwaves at the operating frequency of the uplink transceiver and propagating downstring are reflected constructively by the uplink reflector towards the uplink antenna feed, and the downlink reflector is positioned longitudinally along the through bore at a distance relative to the downlink antenna feed such that microwaves at the operating frequency of the downlink transceiver and propagating upstring are reflected constructively by the downlink reflector towards the downlink antenna feed.

7. A system as claimed in claim 1 wherein the bottom hole unit comprises a telemetry subsystem with at least one measurement-while-drilling sensor and a communications subsystem communicative with the telemetry subsystem and comprising a processor and a memory having encoded thereon program code executable by the processor to read measurement data from the sensor and send the measurement data to the uplink transceiver subassembly to encode into microwave communication signals for transmission to an adjacent upstring communications node.

8. A system as claimed in claim 2 wherein at least one of the repeater units comprises a telemetry subsystem with at least one measurement-while-drilling sensor and a communications subsystem communicative with the telemetry subsystem and comprising a processor and a memory having encoded thereon program code executable by the processor to read measurement data from the sensor and send the measurement data to the uplink transceiver subassembly to encode into microwave communication signals for transmission to an adjacent upstring communications node.

9. A system as claimed in claim 2 wherein at least one of the repeater units further comprise an obstruction receptacle inside the through bore of the tubular sub in between the uplink and downlink antenna feeds and configured to receive an obstruction in the drill string, and wherein the uplink and downlink transceivers are communicatively coupled to each other by a hardwired connection.

10. A system as claimed in claim 9 wherein the drill string is configured for an air drilling operation and the obstruction is an air drilling one-way valve.

11. A system as claimed in claim 2 wherein at least one of the repeater units further comprises a communications link to a controllable device in the drill string, and a communications subsystem is communicative with the communications link and at least one of the uplink and downlink transceiver subassemblies and comprises a processor and a memory having encoded thereon program code executable by the processor to decode a microwave communications signal into control instructions and to control the controllable device in accordance with the control instructions.

12. A system as claimed in claim 1 further comprising a telemetry and control interface communicative with the topside unit and comprising an operator interface.

13. A system as claimed in claim 1 wherein at least one of the communications nodes further comprises a communication subsystem communicative with the transceiver of that node and having a processor and a memory having encoded thereon message buffering program code executable by the processor to store a message in the memory for a temporary period of time before the communication signal containing the message is transmitted by the transceiver.

14. A method for communicating wirelessly during a downhole drilling operation, comprising:
 (a) establishing a wireless communications link between:
  (i) a topside unit mounted around a top of a drill string and comprising a tubular sub with an axial through-bore for flow of fluid therethrough, a microwave downlink transceiver subassembly mounted to the tubular sub and having a first antenna feed extending into the through-bore, and a microwave reflector mounted inside the through-bore and upstring of the first antenna feed and comprising at least one aperture configured to reflect a range of frequencies including an operating frequency of the downlink transceiver subassembly and to allow passage of fluid therethrough; and
  (ii) a bottom hole unit mounted along the drill string downstring of the topside unit and comprising a tubular sub with an axial through-bore for flow of fluid therethrough, a microwave uplink transceiver subassembly mounted to the tubular sub and having a second antenna feed extending into the through-bore, and a microwave reflector mounted inside the through-bore and downstring of the second antenna feed and comprising at least one aperture configured to reflect a range of frequencies including an operating frequency of the uplink transceiver subassembly and to allow passage of fluid therethrough; and (b) sending and receiving microwave signals at an operating frequency between the topside unit and the bottom hole unit.

15. A method as claimed in claim 14 further comprises establishing a wireless communications link between one or more repeater units and the topside and bottom hole units, wherein the one or more repeater units are mounted along the drill string between the topside and bottom hole units, each repeater unit comprising a tubular sub with an axial through-bore for flow of fluid therethrough, a microwave uplink transceiver subassembly mounted to the tubular sub and having an uplink antenna feed extending into the through-bore, a microwave downlink transceiver subassembly mounted to the tubular sub, communicatively coupled to the microwave uplink transceiver subassembly and having a downlink antenna feed extending into the through-bore, and at least one microwave reflector mounted inside the through-bore between the uplink and downlink antenna feeds and comprising at least one aperture configured to reflect a range of frequencies including the operating frequency of the uplink and downlink transceiver subassemblies and to allow passage of fluid therethrough.

16. A method as claimed in claim 15 further comprising sending and receiving microwave signals at a first operating frequency between a first communications segment comprising the downlink transceiver subassembly of the topside unit and the uplink transceiver subassembly of a repeater unit adjacent and downstring of the topside unit;

sending and receiving microwave signals at a second operating frequency between a second communications segment comprising the uplink transceiver subassembly of the bottom hole unit and the downlink transceiver subassembly of a repeater unit adjacent and upstring of the bottom hole unit; and when there are at least two repeater units, sending and receiving microwave signals between a third communications segment comprising the downlink transceiver subassembly of a first repeater unit and the uplink transceiver subassembly of a second repeater unit adjacent and downstring of the first repeater unit;

wherein at least two of the operating frequencies of the first, second and third communications segments are different from each other.

17. A method as claimed in claim 16 wherein the step of establishing the wireless communications link comprises mounting the topside unit around the top of the drill string and mounting the bottom hole unit along the drill string, establishing the wireless communication link between the downlink transceiver subassembly of the topside unit and uplink transceiver subassembly of the bottom hole unit, installing drill pipe to the drill string upstring of the bottom hole unit and lowering the drill string into a borehole until a signal strength of the communication link between the topside unit and the bottom hole unit falls to a minimum threshold, then mounting one of the repeater units to the drill string and establishing a communications link between the downlink transceiver subassembly of the repeater unit and the uplink transceiver subassembly of the bottom hole unit and a communications link between the uplink transceiver subassembly of the repeater unit and the downlink transceiver subassembly of the topside unit.

* * * * *